(12) United States Patent
Hirakawa

(10) Patent No.: US 9,221,272 B2
(45) Date of Patent: Dec. 29, 2015

(54) OPTICAL SCANNING DEVICE AND IMAGE FORMING APPARATUS

(75) Inventor: Makoto Hirakawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1250 days.

(21) Appl. No.: 11/857,069

(22) Filed: Sep. 18, 2007

(65) Prior Publication Data

US 2008/0068440 A1  Mar. 20, 2008

(30) Foreign Application Priority Data

Sep. 19, 2006 (JP) ................................. 2006-253055

(51) Int. Cl.
| | |
|---|---|
| B41J 15/14 | (2006.01) |
| B41J 27/00 | (2006.01) |
| B41J 2/47 | (2006.01) |
| G02B 26/10 | (2006.01) |
| G02B 26/12 | (2006.01) |

(52) U.S. Cl.
CPC ............... B41J 2/473 (2013.01); G02B 26/105 (2013.01); G02B 26/123 (2013.01)

(58) Field of Classification Search
USPC ......... 347/230–233, 241–245, 256–261, 263; 359/203.1, 204.1, 205.1, 206.1, 212.1
See application file for complete search history.

(56) References Cited

U.S. PATENT DOCUMENTS

| | | | |
|---|---|---|---|
| 6,141,118 A * | 10/2000 | Yamawaki et al. ........... | 358/481 |
| 6,804,064 B2 | 10/2004 | Hirakawa | |
| 6,829,102 B2 | 12/2004 | Ohashi et al. | |
| 7,031,039 B2 * | 4/2006 | Takayama ................... | 359/204.1 |
| 7,079,326 B2 | 7/2006 | Hirakawa | |
| 7,099,061 B2 * | 8/2006 | Tamaru ....................... | 359/204.1 |
| 7,629,992 B2 * | 12/2009 | Nakahata ...................... | 347/243 |
| 7,659,918 B2 * | 2/2010 | Turner .......................... | 347/230 |
| 2006/0203264 A1 * | 9/2006 | Miyatake ...................... | 358/1.7 |
| 2007/0002417 A1 | 1/2007 | Hirakawa et al. | |
| 2007/0030538 A1 | 2/2007 | Hirakawa et al. | |

FOREIGN PATENT DOCUMENTS

| | | |
|---|---|---|
| JP | 11-14932 | 1/1999 |
| JP | 11-38348 | 2/1999 |
| JP | 3450653 | 7/2003 |
| JP | 2004-70109 | 3/2004 |
| JP | 2006-11291 | 1/2006 |
| JP | 2006-64876 | 3/2006 |
| JP | 2006-72288 | 3/2006 |

OTHER PUBLICATIONS

Japanese Office Action issued Jan. 31, 2012 in patent application No. 2006-253055.

* cited by examiner

*Primary Examiner* — Hai C Pham
(74) *Attorney, Agent, or Firm* — Oblon, McClelland, Maier & Neustadt, L.L.P.

(57) ABSTRACT

An optical scanning device includes a light-source unit that emits a plurality of light beams, a deflector that deflects the light beams, and an image-forming optical system that receives the light beam deflected by the deflector and forms a spot image on photoconductors. The image-forming optical system includes a first scanning lens that allows only a corresponding light beam to pass and is arranged to form, upon receiving a virtual light beam, the spot image on the photoconductor with a not-curved line. The virtual line lies between a pair of light beams that travels in one of areas separated by a reference plane that is parallel to a sub-scanning direction and on which a normal line to a deflection plane of the deflector falls.

14 Claims, 10 Drawing Sheets

CURVED DIRECTION IS VARIED (INVERSED) DEPENDING ON DIRECTION (OBLIQUE INCIDENT DIRECTION) OF INCIDENT LIGHT BEAM

SINCE PERIPHERAL LIGHT BEAM PASSES OUTSIDE AXIS, LENS IS SUSCEPTIBLE TO INFLUENCE OF CHANGES IN SHAPE OR LIKE DUE TO TEMPERATURE FLUCTUATION

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2006-253055 filed in Japan on Sep. 19, 2006.

BACKGROUND OF THE INVENTION

1. Field of the Invention

The present invention relates to an optical scanning device for use in an image forming apparatus.

2. Description of the Related Art

In image forming apparatuses, such as digital copiers, facsimiles, and laser printers, various optical scanning devices are used to scan a photosensitive member with a light beam. In a field of those image forming apparatuses, more and more apparatuses can form full-color images recently. For this reason, an optical scanning device capable of forming a plurality of scanning lines on a plurality of photoconductors at one time has been demanded.

Several schemes can be taken for a developing device satisfying such a demand. For example, a tandem-type developing device has been used in which four photoconductors each corresponding to yellow, magenta, cyan or black are arranged. As a low-cost optical scanning device suitable for such a tandem-type developing device, an oblique-incident-type optical scanning device has been used in which a light beam from a light source enters with an angle in a sub-scanning direction with respect to the normal line of a deflection plane of a deflector that deflects the light beam from a light source.

However, such an oblique-incident-type optical scanning device has a significant problem called "curved scanning line". This "curved scanning line" is a phenomenon in which the path of a light beam is curved with respect to a main scanning direction on the external surface of a photoconductor as a scan target surface. The amount of occurrence of the scanning line is variably curved depending on the oblique incident angle of each light beam in the sub-scanning direction. If the scanning line is curved, a color-shifted toner image is formed, because a toner image is obtained by developing four latent images that are drawn with light beams to form four single-toner images and superposing the four single-color toner image.

Also, in the oblique-incident-type optical scanning device explained above, a light beam from the light source is caused to enter toward a rotational axis of a polygon mirror as a deflector. Therefore, when the light source is arranged on a line stretching from the optical axis of a scanning lens in the main scanning direction, the oblique incident angle (inclination of the light beam entering the deflector in the sub-scanning direction) increases so as to avoid interference with the scanning lens. For this reason, in the oblique-incident-type optical scanning device, the increase of the oblique incident angle increases the amount of occurrence of the curve in a scanning line explained above, and therefore the amount of occurrence of color shift also tends to increase.

Moreover, in the oblique-incident-type optical scanning device explained above, the light beam from the light source obliquely enters the deflector, and therefore the light beam enters with respect to the scanning lens in a twisted manner. This increases wave aberration and, in particular, the optical performance in image height peripheral to the luminous ray tends to significantly deteriorate. That is, in the oblique-incident-type optical scanning device, wave aberration tends to significantly deteriorate at a peripheral image height (near both ends of the scanning line) due to a light beam skew. When such wave aberration occurs, the spot diameter of the light beam is increased at the peripheral image height. Unless such a problematic increase in spot diameter of the light beam is resolved, "high-density optical scanning", which has been strongly demanded in recent years, cannot be achieved. For this reason, in the oblique-incident-type optical scanning device explained above, an increase in image quality tends to be difficult due to wave aberration.

Furthermore, the increase in image quality demanded from the market requires a reduction in color shift. However, in the oblique-incident-type optical scanning device, a scanning line is curved. In particular, in an optical scanning device in which a plurality of light beams enter at different angles in the sub-scanning direction with respect to the normal line to the deflection plane, the magnitudes and directions of curves in scanning lines differ and, as a result, a large color shift occurs.

To suppress the curve in a scanning line described above, various schemes have been conventionally used.

In Japanese Patent Application Laid-Open Publication No. 10-73778 (hereinafter referred to as a first patent document), an optical scanning device is disclosed in which a plurality of rotational asymmetrical lenses are provided to an image-forming optical system in which an image is formed on the external surface of a photoconductor from a light beam deflected by a deflector and a generatrix shape connecting vertexes of child lines of lens surfaces of these aspheric lenses is curved in a sub-scanning direction.

In Japanese Patent Application Laid-Open Publication No. 2004-70109 (hereinafter referred to as a second patent document), an optical scanning device is disclosed in which an obliquely incident light beam is caused to pass outside of the axis of a scanning lens of an image-forming optical system and the aspheric amount of child lines of the scanning lens is formed on a plane varied along the main-scanning direction to align the positions of the scanning lines.

In Japanese Patent Application Laid-Open Publication No. 2006-11291 (hereinafter referred to as a third patent document), an optical scanning device is disclosed in which the number of reflection mirrors of an image-forming optical system is defined to match the directions of occurrence of curve in a scanning line, thereby reducing a color shift.

In Japanese Patent Application Laid-Open Publication No. 2006-72288 (hereinafter referred to as a fourth patent document), an optical scanning device is disclosed in which scanning lenses provided correspondingly to photoconductors of an image-forming optical system are each provided with at least one special tilt-decentered plane, which is a plane without a curvature in a sub-scanning direction and has a different tilt-decentered angle in the sub-scanning direction according to an image height.

In Japanese Patent Application Laid-Open Publication No. 11-14932 (hereinafter referred to as a fifth patent document), an optical scanning device is disclosed that adopts, as a scheme of correcting "a large curve in a scanning line" unique to an oblique incident type, a scheme of providing an image-forming optical system with "a lens having a lens surface on which an inclination unique to the lens surface in sub-scanning cross-section is changed in a main scanning direction so as to correct a curve in a scanning line".

In Japanese Patent Application Laid-Open Publication No. 11-38348 (hereinafter referred to as a sixth patent document), an optical scanning device is disclosed that adopts a scheme of providing an image-forming optical system with "a corrected reflection plane having an reflection plane obtained by changing an inclination unique to the reflection plane in sub-scanning cross section into a main scanning direction so as to correct a curve in a scanning line".

However, the lens having a "lens surface in which a generatrix shape connecting vertexes of child lines is curved in a sub-scanning direction" disclosed in the first patent document solves various problems by curving the generatrix, and an individual scanning lens is required to support each incident light beam. Therefore, if such a lens is simply applied to a tandem optical system, the number of the types of scanning lenses is increased, thereby increasing the number of types of component configuring an optical scanning device, that is, an image forming apparatus.

Also, the lens disclosed in the first patent document has a curvature in a sub-scanning direction. Therefore, if a position from which the light beam enters the lens is shifted in the sub-scanning direction due to influences of assembling error, processing error, environmental fluctuations, and other factors, the shape of the curve in a scanning line is changed upon reception of the influence of refracting power of the lens in the sub-scanning direction. This poses a problem of occurrence of color shift without achieving an initial (or designed) effect of suppressing a color shift in a color image.

In the optical scanning device disclosed in the second patent document, the correction is exemplarily made with one scanning lens. Although the correction of a curve in a scanning line can be made, deterioration in light beam spot diameter due to an increase in wave aberration, which will be explained further below, is not mentioned.

In the optical scanning device disclosed in the third patent document, a color shift is reduced by providing an odd-number difference between the number of reflection mirrors for light beams entering from an upper side of a polygon mirror as a deflector and the number of reflection mirrors for light beams entering from a lower side thereof, thereby aligning the directions of the curve in the scanning lines. However, since an anamorphic aspheric lens is used as a scanning lens, the amount of occurrence of curve in a scanning line is not mentioned.

Also, polygon mirrors adjacent to each other have the same number of reflection mirrors for two light beams entering from the upper side of these polygon mirrors, and also have the same number of reflection mirrors for light beams entering from the lower side of these polygon mirrors. Therefore, the layout disadvantageously tends to be restricted.

In the optical scanning device disclosed in the fourth patent document, the curve in a scanning line is excellently corrected by using a special tilt-decentered plane. However, the second lens for each light beam has an asymmetrical shape in a main scanning direction. Therefore, when the optical scanning device is used for a one-side scanning system, for example, the number of types of lens is increased to four, thereby increasing a development period. Thus, the number of types of component configuring the optical scanning device, that is, an image forming apparatus, is increased.

Furthermore, in the optical scanning devices disclosed in the first to sixth patent documents, a large curve in a scanning line, which is a characteristic to the optical scanning device of an oblique incident type, can be excellently corrected, but wave aberration explained above cannot be sufficiently corrected.

In particular, in the optical scanning device disclosed in the first patent document, when a plurality of light beams toward different scan target surfaces are caused to enter the same lens, various problems can be solved for one light beam by curving a generatrix shape. However, for other light beams, it is difficult to reduce a curve in a scanning line and wave aberration. Moreover, also in correction of wave aberration, as for a plane with a curvature, the skew state of a light beam is significantly changed due to fluctuations of the incident light beams, and therefore it is difficult to stably achieve a light beam having an excellent spot diameter.

SUMMARY OF THE INVENTION

It is an object of the present invention to at least partially solve the problems in the conventional technology.

According to an embodiment of the present invention, there is provided an optical scanning device that forms images on a plurality of photoconductors. The optical scanning device includes a light-source unit that emits a plurality of light beams, each light beam corresponding to each one of the photoconductors; a deflector that deflects the light beams; and an image-forming optical system that receives the light beam deflected by the deflector, and forms a spot image on a scan target surface of each one of the photoconductors by using a corresponding one of the light beam. The image-forming optical system includes a first scanning lens corresponding to each one of the photoconductors, the first scanning lens allowing only the corresponding light beam to pass. The first scanning lens is arrange to form, upon receiving a virtual light beam, the spot image on the corresponding photoconductor with a not-curved line, the virtual light beam lying between a first beam and a second beam from among the light beams that travel in one of areas separated by a reference plane that is parallel to a sub-scanning direction and on which a normal line to a deflection plane of the deflector falls.

According to another aspect of the present invention, there is provided an image forming apparatus. The image forming apparatus includes a plurality of photoconductors; a charging device that charges on a corresponding one of the photoconductors; a developing device that develops an image on the corresponding photoconductor; and the optical scanning device described above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
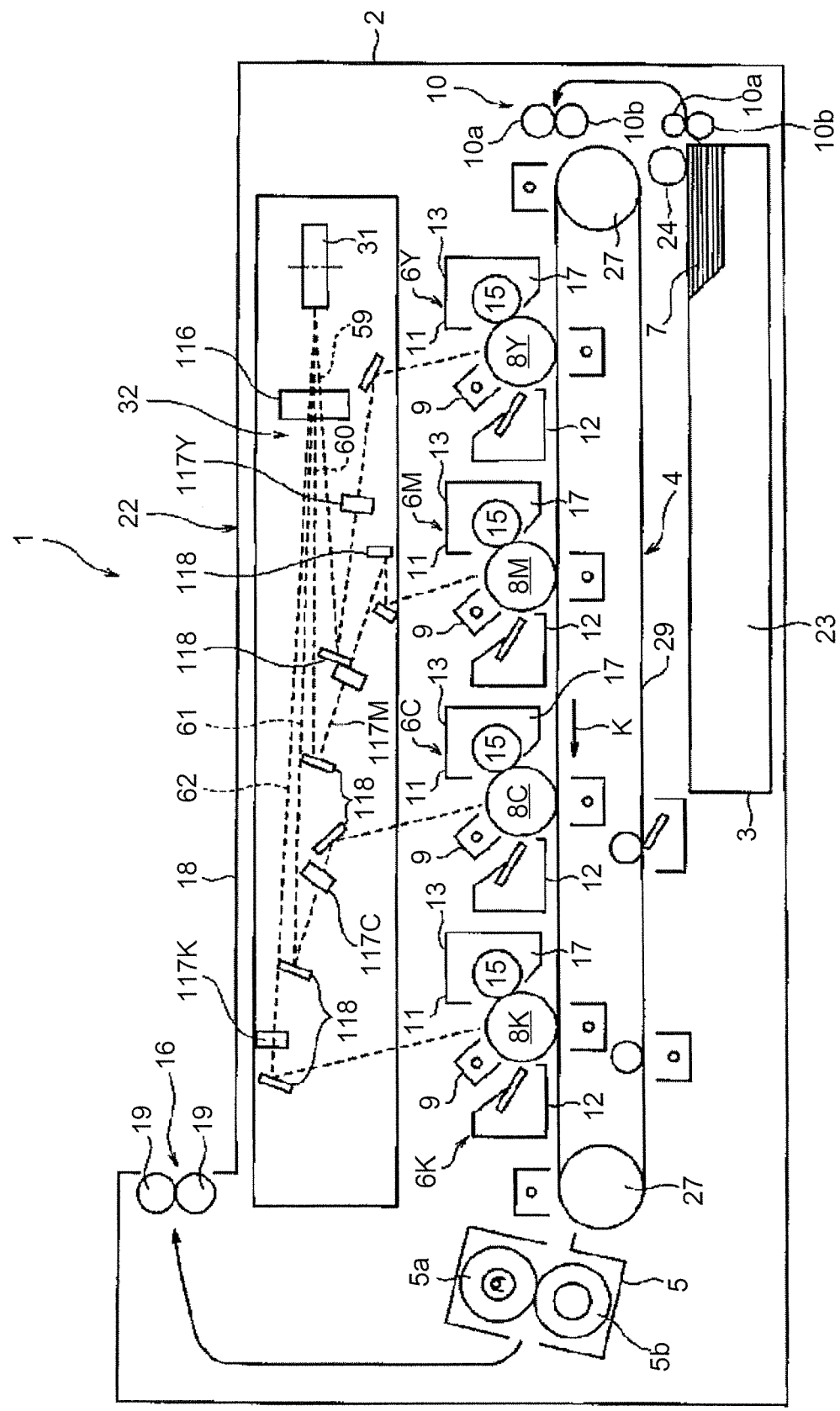
FIG. 1 is a front view of an image forming apparatus according to a first embodiment of the present invention.
Figure 2:
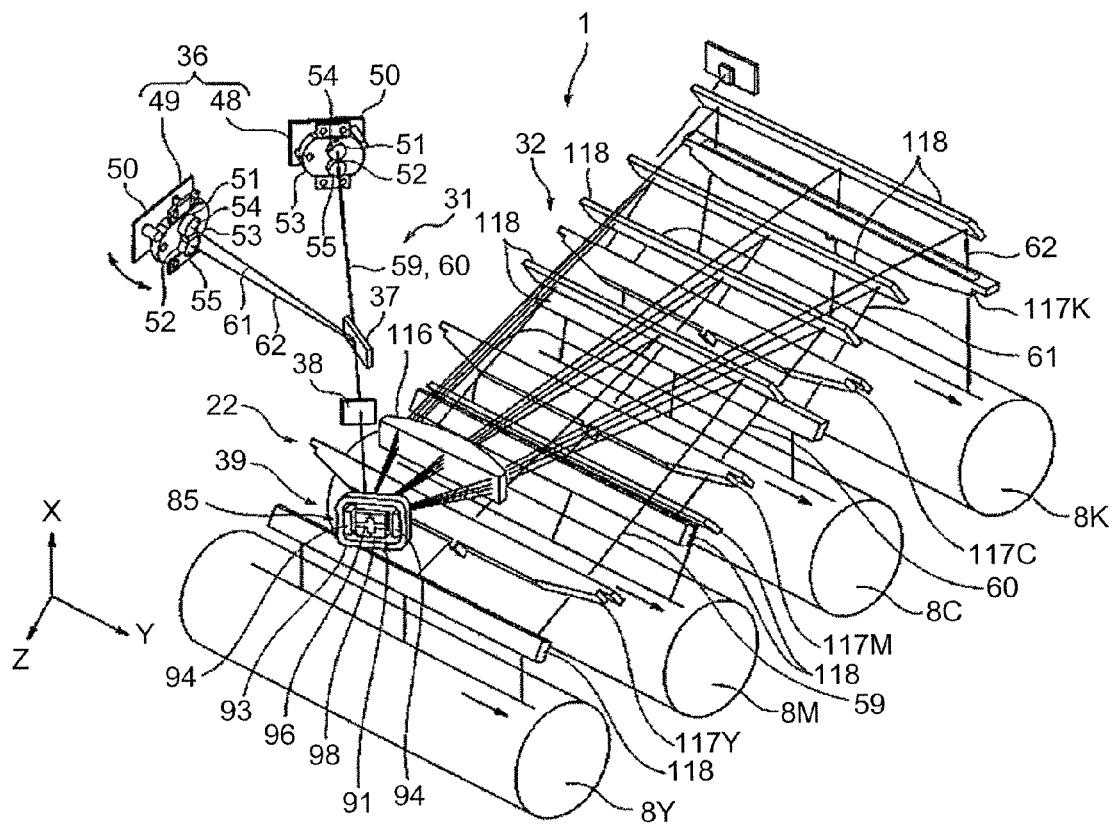
FIG. 2 is a perspective view of a laser writing unit, photosensitive drums shown in FIG. 1.

FIG. 1 is a front view of an image forming apparatus 1 according to a first embodiment of the present invention. FIG. 2 is a perspective view of relevant parts such as a laser writing unit 22 and photosensitive drums 8 (8Y, 8M, 8C, 8K) for use in the image forming apparatus 1.

The image forming apparatus 1 forms images of colors of yellow (Y), magenta (M), cyan (C), and black (K), that is, color images, on a recording sheet 7 (shown in FIG. 1) as one transfer material. The image forming apparatus 1 is a so-called tandem-type full-color laser printer. Units corresponding to the respective colors of yellow, magenta, cyan, and black are represented by Y, M, C, and K, respectively, attached to the end of each reference numeral. The image forming apparatus 1 at least includes, as shown in FIG. 1, an main housing 2, a paper-feeding unit 3, a pair of registration rollers 10, a transferring unit 4, a fixing unit 5, the laser writing unit 22 as an optical scanning device, a plurality of process cartridges 6Y, 6M, 6C, and 6K, and a paper delivering unit 16.

The main housing 2 is formed in a box shape, for example, and is placed on a floor or the like. The main housing 2 houses the paper-feeding unit 3, the registration rollers 10, the transferring unit 4, the fixing unit 5, the laser writing unit 22, and the process cartridges 6Y, 6M, 6C, and 6K.

At least one paper-feeding unit 3 is provided under the main housing 2. The paper-feeding unit 3 houses the recording sheets 7 explained above as being stacked, and includes a paper-feeding cassette 23 insertable to the main housing 2 and a paper-feeding roller 24. The paper-feeding roller 24 is pressed onto the recording sheet 7 on top in the paper-feeding cassette 23. The paper-feeding roller 24 sends out the recording sheet 7 on top to a gap between a pair of rollers 10a and 10b of the registration rollers 10.

The registration rollers 10 are provided on a conveyance path of the recording sheet 7 conveyed from the paper-feeding unit 3 to the transferring unit 4, and include the rollers 10a and 10b. The registration rollers 10 nip the recording sheet 7 between the rollers 10a and 10b, and send out the nipped recording sheet 7 to a gap between the transferring unit 4 and the process cartridges 6Y, 6M, 6C, and 6K at a timing when tone images can be superposed (at a timing of start of recording in a sub-scanning direction (lateral direction in FIG. 1).

The transferring unit 4 is provided above the paper-feeding unit 3. The transferring unit 4 includes a plurality of rollers 27 and a transfer belt 29. The rollers 27 are each rotatably provided to the main housing 2, and at least one of them is driven by a motor as a driving source for rotation. The transfer belt 29 is formed in an endless ring shape, and is stretched over the rollers 27 explained above. Stretched over the rollers 27 explained above, the transfer belt 29 is positioned below and near the process cartridges 6Y, 6M, 6C, and 6K. With at least one of the rollers 27 being driven by the motor or the like for rotation, the transfer belt 29 circulates (endlessly runs) around the rollers 27.

In the transferring unit 4, the recording sheet 7 sent from the paper-feeding unit 3 is pressed with the transfer belt 29 onto the external surfaces of the photosensitive drums 8 of the process cartridges 6Y, 6M, 6C, and 6K, thereby causing the toner image on each photosensitive drum 8 to be transferred onto the recording sheet 7. The transferring unit 4 then sends the recording sheet 7 transferred with the toner images pressed thereon toward the fixing unit 5.

The fixing unit 5 includes a pair of rollers 5a and 5b nipping the recording sheet 7 therebetween. The fixing unit 5 presses and heats the recording sheet 7 sent from the transferring unit 4 to a gap between the rollers 5a and 5b, thereby causing the toner image transferred from each photosensitive drum 8 onto the recording sheet 7 to be fixed onto the recording sheet 7.

The laser writing unit 22 is arranged above the main housing 2, that is, above the paper-feeding unit 3 and the transferring unit 4. The laser writing unit 22 emits laser light onto the external surfaces of the photosensitive drums 8 each uniformly charged by an electric charger 9, which will be explained further below, of each of the process cartridges 6Y, 6M, 6C, and 6K, thereby forming an electrostatic latent image. The laser writing unit 22 records an image (forms an electrostatic latent image) on the external surface of each photosensitive drum 8 for two lines with each reciprocating scanning with one cycle of a vibrating mirror 85, which will be explained further below. The detailed configuration of this laser writing unit 22 will be explained further below.

The process cartridges 6Y, 6M, 6C, and 6K are each provided between the transferring unit 4 and the laser writing unit 22. The process cartridges 6Y, 6M, 6C, and 6K are removably housed in the main housing 2. The process cartridges 6Y, 6M, 6C, and 6K are arranged in line along a direction of conveying the recording sheet 7 (lateral direction in FIG. 1).

Each of the process cartridges 6Y, 6M, 6C, and 6K houses a cartridge case 11, the electric charger 9 as a charging device, the photosensitive drum 8 as a photoconductor (which is also referred to as an image carrier), a cleaning case 12 as a cleaning device, a developing device 13, and others. Therefore, the image forming apparatus 1 at least includes the electric charger 9, the photosensitive drum 8, the cleaning case 12, and the developing device 13.

The cartridge case 11 can be removably housed in the main housing 2, and houses the electric charger 9, the photosensitive drum 8, the cleaning case 12, and the developing device 13. The electric charger 9 uniformly charges the external surface of the photosensitive drum 8. The photosensitive drum 8 is arranged so as to be spaced apart from a developing roller 15, which will be explained further below, of the developing device 13. The photosensitive drum 8 is formed in a columnar or cylindrical shape centering on its axial center.

The photosensitive drum 8 carries an electrostatic latent image formed on its external surface by a corresponding one of the laser writing units 22Y, 22M, 22C, and 22K. The photosensitive drum 8 has the electrostatic latent image formed and carried on its external surface and, to the electrostatic latent image, toner is absorbed for development. Thus obtained toner image is transferred onto the recording sheet 7 positioned between the relevant photosensitive drum and the transfer belt 29. The external surface of the photosensitive drum 8 serves as a scan target surface recited in the claims. The cleaning case 12 removes residual transfer toner left on the external surface of the photosensitive drum 8 after the toner image is transferred onto the recording sheet 7.

The developing device 13 at least includes a toner cartridge 17 and the developing roller 15 as a developer carrier.

The toner cartridge 17 houses toner of a desired color, and supplies the toner to the external surface of the developing roller 15.

The developing roller 15 is arranged in parallel to and near the photosensitive drum 8. The space between the developing roller 15 and the photosensitive drum 8 forms a developing area in which the toner is absorbed onto the photosensitive drum 8 for developing an electrostatic latent image to obtain a toner image.

The developing device 13 sufficiently stirs the toner in the toner cartridge 17, and causes the stirred toner to be absorbed onto the external surface of the developing roller. In the developing device 13, the developing roller 15 rotates to cause the toner to be absorbed onto the photosensitive drum 8. In this manner, the developing device 13 causes the toner to be carried on the developing roller 15 and conveyed to the developing area to develop the electrostatic latent image on the photosensitive drum 8, thereby forming a toner image.

The paper delivering unit 16 includes a paper-receiving tray 18 provided on an upper surface of the main housing 2 and a pair of paper-delivery rollers 19. The recording sheet 7 on which the toner image is fixed passes through between the paper-delivery rollers 19. The recording sheet 7 is nipped between the rollers 5a and 5b of the fixing unit 5. The paper-delivery rollers 19 cause the recording sheet 7 with the toner images fixed thereon to be delivered onto the paper-receiving tray 18.

The image forming apparatus 1 configured in the manner explained above forms a color image on the recording sheet 7 in a full-color mode, as explained in the following. First, in the image forming apparatus 1, each photosensitive drum 8 is rotated, and the electric charger 9 uniformly charges the external surface of the photosensitive drum 8. On the external surface of the photosensitive drum 8, the laser writing unit 22 forms a relevant electrostatic latent image corresponding to each color signal through optical scanning with relevant one of light beams 59, 60, 61, and 62 based on an image signal of a relevant color. Then, these electrostatic latent images are positioned in the developing area, and toner absorbed on the external surface of the developing roller 15 of the relevant developing device 13 is absorbed for development, thereby forming a toner image on the external surface of the photosensitive drum 8.

Then, in the image forming apparatus 1, the recording sheet 7 conveyed with the paper-feeding roller 24 of the paper-feeding unit 3 and others is positioned between the photosensitive drums 8 of the process cartridges 6Y, 6M, 6C, and 6K in sequence and the transfer belt 29 of the transferring unit 4. The toner images formed on the external surface of the photosensitive drums 8 of the process cartridges 6Y, 6M, 6C, and 6K are then sequentially transferred onto the recording sheet 7. With these toner images being superposed on the recording sheet 7, a full-color image is formed on the recording sheet 7. In the image forming apparatus 1, a full-color image is fixed onto the recording sheet 7 at the fixing unit 5, and this recording sheet 7 is delivered onto the paper-receiving tray 18 of the paper delivering unit 16. In this manner, the image forming apparatus 1 forms a color image on the recording sheet 7.

Figure 3:
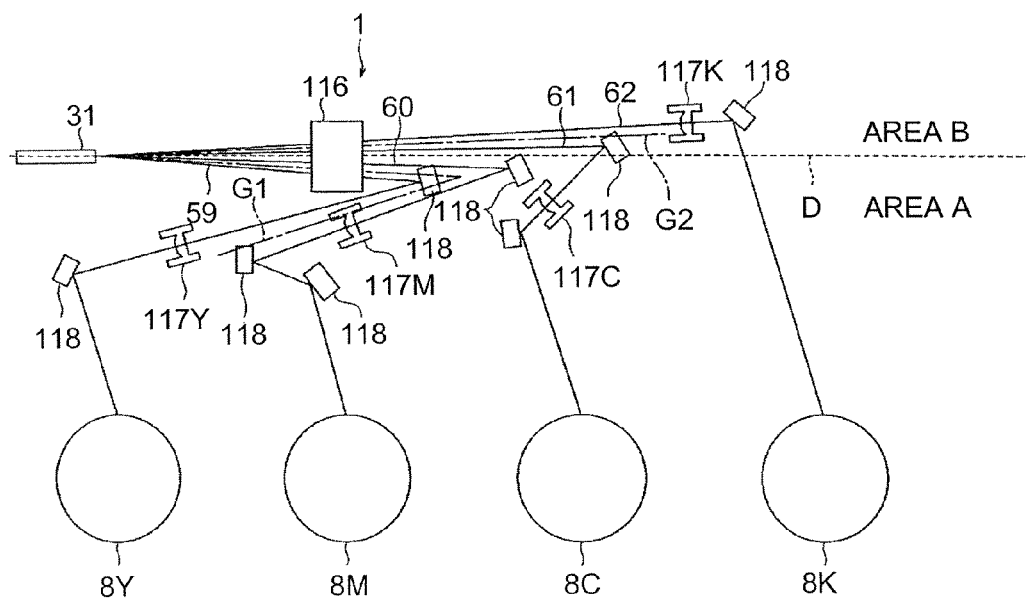
FIG. 3 is a side view of the laser writing unit, the photosensitive drums shown in FIG. 2.

The laser writing unit 22 is explained in detail below. As shown in FIGS. 2 and 3, in the laser writing unit 22 that is integrally formed for scanning each photosensitive drum 8, the light beams 59, 60, 61, and 62 emitting from semiconductor lasers 51 and 52, which will be explained further below, corresponding to the four photosensitive drums 8Y, 8M, 8C, and 8K equally spaced apart along a moving direction K of the recording sheet 7 (represented by an arrow in FIG. 1) are deflected by the vibrating mirror 85 and are then separated for guidance to the photosensitive drums 8Y, 8M, 8C, and 8K, thereby simultaneously forming electrostatic latent images. A direction parallel to rotating axes of the photosensitive drums 8Y, 8M, 8C, and 8K is represented by an arrow Y and is referred to as a main scanning direction. A direction parallel to optical axes of the light beams 59, 60, 61, and 62 changed by the vibrating mirror 85 rotating on an axis extending in direction X, which will be explained further below, is represented by an arrow X and is referred to as an optical axis direction. A direction orthogonal to both of the main scanning direction Y and the direction X is represented by an arrow Z and is referred to as a sub-scanning direction.

The laser writing unit 22 includes, as shown in FIGS. 2 and 3, a first housing (not shown), a light-source device 31, and an image-forming optical system 32. The first housing is formed in a frame shape and is housed in the main housing 2.

The light-source device 31 includes a second housing (not shown), a light-source unit 36, an incident mirror 37, a cylindrical lens 38 as a line-image forming lens, and a deflector 39. The second housing is formed of synthetic resin in a flat box shape.

Figure 4A:
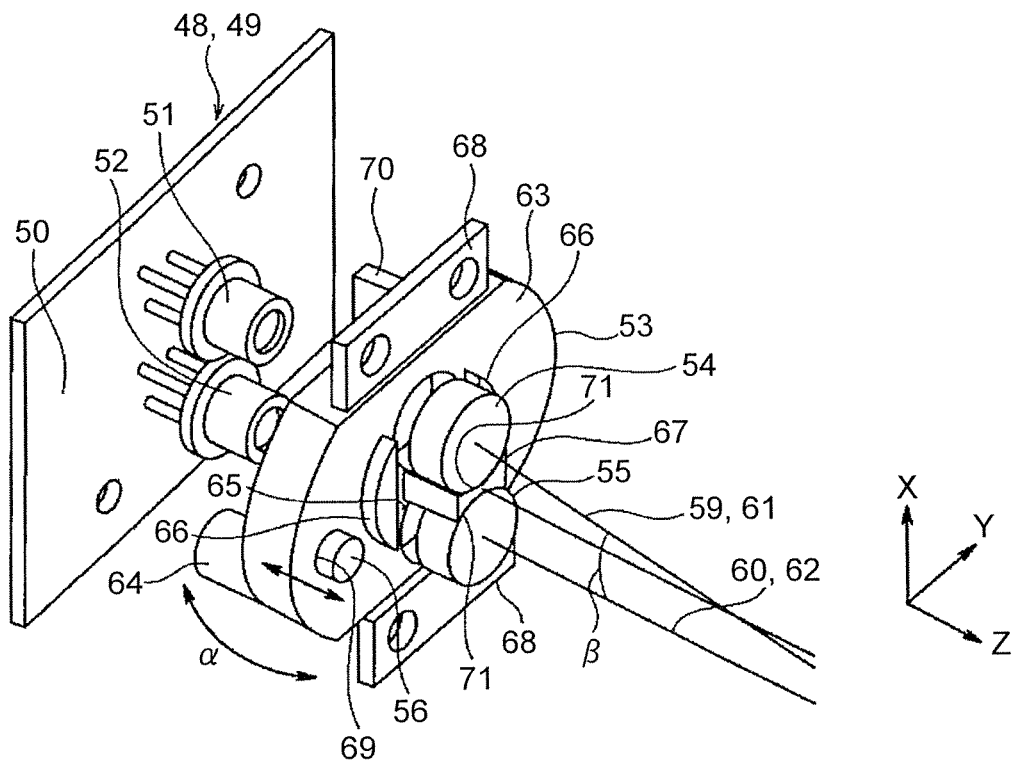
FIG. 4A is an exploded perspective view of a light-source unit shown in FIG. 2.
Figure 4B:
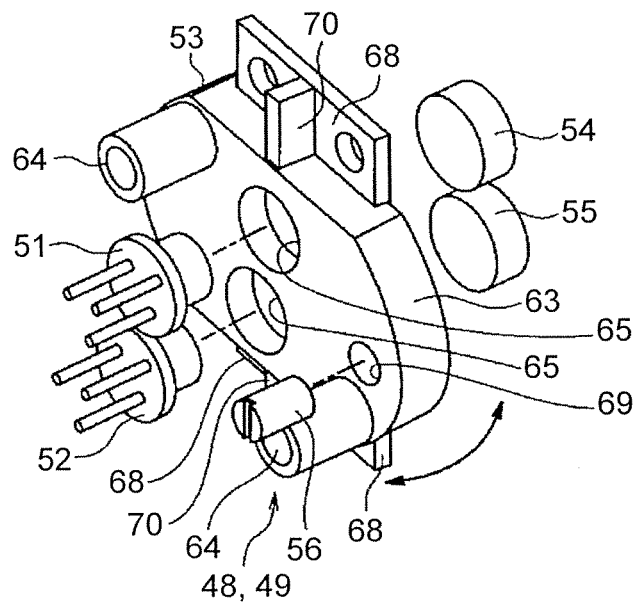
FIG. 4B is a rear perspective view of the light-source unit shown in FIG. 4A.

The light-source unit 36 includes, as shown in FIG. 2, a pair of light-source units 48 and 49. Each of the light-source units 48 and 49 includes, as shown in FIGS. 4A and 4B, a printed board 50, the semiconductor lasers 51 and 52, a holder member 53, a pair of coupling lenses 54 and 55, an adjusting screw 56, and a driving circuit implemented on the printed board 50. The printed board 50 includes, for example, an insulating board and a wiring pattern formed on the external surface of the insulating board.

The semiconductor lasers 51 and 52 are spaced apart from each other along the sub-scanning direction Z and are implemented on the printed board 50. The semiconductor lasers 51 and 52 each have a one-to-one correspondence with the photosensitive drums 8Y, 8M, 8C, and 8K. That is, the light-source units 48 and 49 each include the semiconductor lasers 51 and 52 as light-emitting sources for two of the process cartridges 6Y, 6M, 6C, and 6K. The semiconductor lasers 51 and 52 emits light beams 59, 60, 61, and 62 toward the relevant ones of the photosensitive drums 8Y, 8M, 8C, and 8K.

In each of the light-source units 48 and 49, these two semiconductor lasers 51 and 52 are provided so that the light beams 59, 60, 61, and 62 emitting from the two semiconductor lasers 51 and 52 form an angle of 2.5 degrees each other and the light beams cross near or on a deflection plane 95 of the vibrating mirror 85, which will be explained further below.

In the example shown in FIG. 2, the light-source unit 48 is provided with its emission axis (not shown) being tilted at 1.25 degrees downward with respect to the main scanning direction Y so that the light beam 60 from the lower semiconductor laser 52 is parallel to the emission axis of the light-source unit 48 and the light beam 59 from the upper semiconductor laser 51 is tilted at 2.5 degrees. The other light-source unit 49 is provided with its emission axis (not shown) being tilted at 1.25 degrees upward with respect to the main scanning direction Z so that the light beam 61 from the upper semiconductor laser 51 is parallel to the emission axis of the light-source unit 49 and the light beam 62 from the lower semiconductor laser 52 is tilted at 2.5 degrees. In this manner, the light-source units 48 and 49 are provided with their heights varied in the sub-scanning direction so that the emission axes of the light-source units 48 and 49, that is, the light beams 59, 60, 61, and 62 from the semiconductor lasers 51 and 52, cross near the deflection plane 95 of the vibrating mirror 85.

Preferably, the light-source units 48 and 49 are provided with their heights varied in the sub-scanning direction Z so that the emission axes of the light-source units 48 and 49, that is, the light beams 59, 60, 61, and 62 from the semiconductor lasers 51 and 52, cross on the deflection plane 95 of the vibrating mirror 85.

The holder member 53 includes a holder body 63 in a thick flat plate shape, a pair of columnar supports 64, two laser positioning holes 65, two protrusions 66, one protrusion 67, two mounting seat faces 68, and an adjusting screw hole 69. The holder body 63 is provided with a spindle 70 protruding toward the sub-scanning direction Z from both ends in the sub-scanning direction Z.

The columnar supports 64 are provided at an outer edge of the holder body 63, protruding from the holder body 63 toward the printed board 50. The columnar supports 64 are each superposed on the printed board 50 and, with a screw penetrating through the printed board 50 being screwed in each columnar support, the holder member 53 is fixed to the printed board 50.

The two laser positioning holes 65 penetrate through the holder body 63, and are arranged so as to be spaced apart from each other along the sub-scanning direction Z. With the semiconductor lasers 51 and 52 entering the inside of the laser positioning holes 65, the semiconductor lasers 51 and 52 are appropriately positioned.

The protrusions 66 are formed in a convex manner from the holder body 63 in a direction away from the printed board 50, that is, toward the deflector 39. These two protrusions 66 have positioned therebetween the two laser positioning holes 65. The outer edge of these protrusions 66 is formed along an inner edge of a fitting hole 45. The protrusions 66 fit in the fitting hole 45 to position the light-source units 48 and 49 with respect to the second housing.

The one protrusion 67 is formed in a convex manner from the holder body 63 in a direction away from the printed board 50, that is, toward the deflector 39. The protrusion 67 is arranged between the two laser positioning holes 65 and also between the two protrusions 66. The protrusion 67 has formed thereon a groove 71 in a U shape in cross section formed on the same plane as the inner surface of the laser positioning holes 65.

The two mounting seat faces 68 are formed in a flat plate shape and are each connected to the spindle 70. The mounting seat faces 68 have their front surfaces on an approximately same plane as the external surface of the holder body 63. The adjusting screw hole 69 is provided at one end of the holder body 63 in the main scanning direction Y, penetrating through the holder body 63.

The positions of the coupling lenses 54 and 55 in the optical axis direction X with respect to the semiconductor lasers 51 and 52 are adjusted so that the optical axes of the coupling lenses 54 and 55 match the optical axes of the semiconductor lasers 51 and 52 and the emitted light beams 59, 60, 61, and 62 become parallel light. With an ultraviolet (UV) adhesive being filled in a space formed with the inner surface of the groove 71 of the protrusion 67, the coupling lenses 54 and 55 are fixed to the protrusion 67, that is, the holder body 63. Therefore, as a matter of course, the coupling lenses 54 and 55 are arranged with their optical axes being tilted so that the optical axes of the light beams 59, 60, 61, and 62 from the semiconductor lasers 51 and 52 are tilted at 2.5 degrees.

The adjusting screw 56 is screwed into the adjusting screw hole 69. With the amount of screwing the adjusting screw 56 being adjusted as appropriate, the amount of protrusion from the holder body 63 to the second housing is changed as appropriate. The driving circuit drives the semiconductor lasers 51 and 52.

As for outputs of the semiconductor lasers 51 and 52, backlight is detected by a sensor for light-amount monitoring mounted on the inside of the same package for each scanning before reaching the image area, and the amount of current to be applied to the light-emitting sources is controlled so that the detection result keeps a constant value during writing for one line.

In each of the above-configured light-source units 48 and 49, the protrusions 66 enter the inside of the fitting hole provided on the second housing so as to be pressed and fixed with the rotational direction being appropriately positioned. With screws penetrating through the second housing being screwed into the mounting seat faces 68, the light-source units 48 and 49 are screwed and fixed to the second housing. At this time, the light-source unit 49 is arranged at a position lower in the sub-scanning direction Z than the position of the light-source unit 48.

The amount of protrusion of the adjusting screw 56 from the holder body 63 is changed appropriately. With this arrangement, the adjusting screw 56 abuts on a side plate of the second housing. According to the amount of protrusion, the holder member 53 elastically deforms with the spindle 70 being taken as a rotational axis, thereby adjusting an inclination in an arrow direction ($\alpha$ direction). With this, the main-scanning positions of the light beams 59, 60, 61, and 62 entering the deflection plane 95 of the vibrating mirror 85 can be changed.

In the above-configured light-source device 31, the light beams 59, 60, 61, and 62 from the total of the four semiconductor lasers 51 and 52 of the light-source units 48 and 49 are obliquely incident to the same deflection plane 95 of the same deflector 39, which will be explained further below. In this manner, the light-source unit 36 serves as a multi-light beam light source with the semiconductor lasers 51 and 52, emitting the light beams 59, 60, 61, and 62. That is, the light-source units 48 and 49 of the light-source unit 36 in the light-source device 31 are provided so that the light beams 59, 60, 61, and 62 enter with an angle in the direction X with respect to the normal line to the deflector 39. Two of the light beams 59, 60, 61, and 62 enter from one side in the direction X (upper side in the drawing and hereinafter referred to an area A) with respect to a reference plane D, which will be explained further below. The remaining two enter from another side in the direction X (lower side in the drawing and hereinafter referred to as an area B) with respect to the reference plane D.

In this manner, the light beams 59, 60, 61, and 62 enter the deflection plane 95 of the deflector 39 from both sides of the reference plane D in the direction X. All of the light beams 59, 60, 61, and 62 are deflected at the deflection plane 95 of the deflector 39, pass through a single second scanning lens 116, which will be explained further below, and then are separated by a reflection mirror 118, which will be explained further below, in the direction X to be guided to the external surfaces of the photosensitive drums 8Y, 8M, 8C, and 8K as corresponding scan target surfaces. The second scanning lens 116 and first scanning lenses 117Y, 117M, 117C, and 117K are provided, thereby achieving a two-scanning-lens configuration. Furthermore, in the present embodiment, the first scanning lenses 117Y, 117M, 117C, and 117K are provided for each of the light beams 59, 60, 61, and 62 guided to the corresponding scan target surfaces.

The incident mirror 37 is housed in the second housing. The four light beams 59, 60, 61, and 62 from the semiconductor lasers 51 and 52 of the light-source units 48 and 49 enter the incident mirror 37 for emission of these four light beams 59, 60, 61, and 62. The four light beams 59, 60, 61, and 62 are emitted from the incident mirror 37 in a state where the four light beams 59, 60, 61, and 62 from the semiconductor lasers 51 and 52 are vertically arranged in line (arranged along the sub-scanning direction Z) and spaced apart in the sub-scanning direction Z.

The cylindrical lens 38 is housed in the second housing. The cylindrical lens 38 is provided with its orientation being deflectable in the sub-scanning direction. The four light beams 59, 60, 61, and 62 emitted from the incident mirror 37 enter the cylindrical lens 38 for emission of these four light beams 59, 60, 61, and 62 toward the deflection plane 95 of the vibrating mirror 85 in the deflector 39. The cylindrical lens 38 converges the light beams 59, 60, 61, and 62 in the sub-scanning direction Z on the deflection plane 95 of the vibrating mirror 85.

Figure 6:
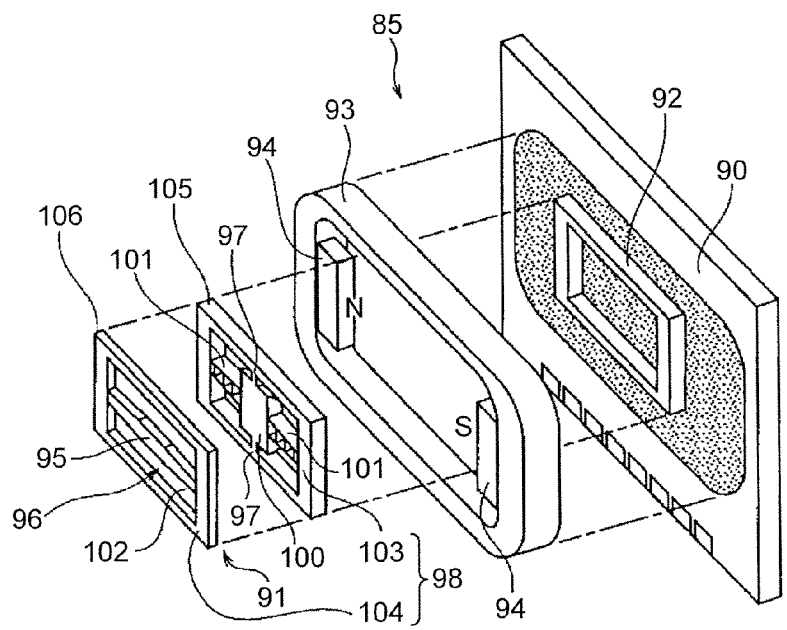
FIG. 6 is an exploded perspective view of the vibrating mirror shown in FIG. 5A.

The deflector 39 includes, as shown in FIG. 6, a circuit board (not shown), a supporting member (not shown), the vibrating mirror 85, and a driving circuit implemented on the circuit board. As a scheme of generating rotary torque of the vibrating mirror 85, electromagnetic driving scheme is exemplarily explained.

The circuit board includes an insulating board and a wiring pattern formed on the surface of the board. On the circuit board, a control integrated circuit (IC) and a quartz oscillator configuring the driving circuit of the vibrating mirror 85, a connector, and other components are implemented. Through the connector, power is supplied from a power supply, and control signals are input and output therethrough.

The supporting member is molded of synthetic resin, protruding from the circuit board. The supporting member positions and holds the vibrating mirror 85.

Figure 5A:
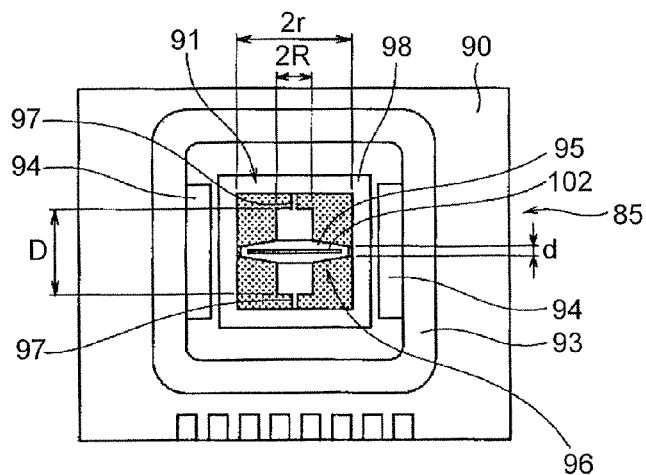
FIG. 5A is a front view of a vibrating mirror shown in FIG. 2.

In the vibrating mirror 85, as shown in FIG. 5A, the deflection plane 95 is pivotally supported by a torsion bar 97. As will be explained further below, the vibrating mirror 85 is manufactured through etching from a silicon board with penetration through an outer shape and then mounted on an implementation board 90. In the present embodiment, a pair of silicon boards is laminated back to back, and the integrated module obtained through lamination is depicted.

The vibrating mirror 85 is supported to a supporting member 84 by inserting one side of the implementation board 90 into an edge connector portion 89, engaging an outer edge with a pressing nail 88 along a positioning unit 87, and causing both side surfaces of the implementation board 90 to go along the positioning unit 87. With this, electrical wirings are simultaneously achieved, and each vibrating mirror 85 can be individually replaced.

Figure 5B:
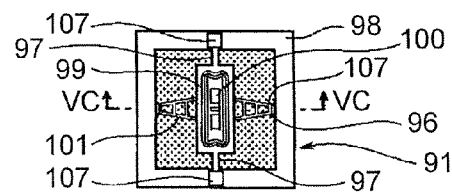
FIG. 5B is a rear view of a mirror unit shown in FIG. 5A.
Figure 5C:
FIG. 5C is a side view of the mirror unit along a VC-VC line shown in FIG. 5B.

The vibrating mirror 85 includes, as shown in FIGS. 5A, 5B, and 6, the implementation board 90 and a mirror unit 91. The implementation board 90 is provided thereon with a frame-shaped seat 92 for the mirror unit 91, and a yoke 93 surrounding the mirror unit 91. A pair of permanent magnets 94 is mounted on the yoke 93. In the permanent magnets 94, an S pole and an N pole is arranged so as to face to each other along a direction orthogonal to a longitudinal direction of the torsion bar 97. The permanent magnets 94 generate a magnetic field in a direction orthogonal to the longitudinal direction of the torsion bar 97.

The mirror unit 91 includes a movable unit 96 that forms the deflection plane 95 on its surface to serve as a vibrator, the torsion bar 97 with one end connected to both ends of the movable unit 96 in the sub-scanning direction Z and protruding from both ends in the sub-scanning direction Z along the sub-scanning direction Z to serve as a rotational shaft, and a frame 98 (corresponding to a frame body) with its inner edge connected to the other end of the torsion bar 97 to serve as a supporting portion. The mirror unit 91 is formed by cutting at least one silicon board through etching. In the present embodiment, the mirror unit 91 is obtained by using a wafer called silicon-on-insulator (SOI) board previously bonded with an oxide film being interposed between two boards 105 and 106 having 60 micrometers and 140 micrometers, respectively.

The movable unit 96 includes a vibrating plate 100 on which a flat coil 99 (shown in FIG. 5B), a reinforcing bar 101 protruding from both ends of the vibrating plate 100 in the main scanning direction Y, and a movable mirror 102 laminated on the vibrating plate 100 and having formed thereon the deflection plane 95. The torsion bar 97 can be twisted and, such twisting causes the movable unit 96, that is, the deflection plane 95 to be rotatable. The frame 98 is configured of a pair of frames 103 and 104 laminated together. In this manner, the vibrating mirror 85 has the frame 98 as a frame body, the torsion bar 97 with its one end connected to the inner edge of the frame 98, and the deflection plane 95 connected to the other end of the torsion bar 97, capable of deflecting the light beams 59, 60, 61, and 62, and rotatable about the torsion bar 97 by twisting the torsion bar 97. Also, in the vibrating mirror 85, with the torsion bar 97 being twisted to rotate the deflection plane 95 about the torsion bar 97, the light beams 59, 60, 61, and 62 from the light-source unit 36 are deflected on the deflection plane 95 and are used for scanning the scan target surface in the main scanning direction Y in a reciprocating manner.

The mirror unit 91 explained above is formed in the following manner. First, from a front surface side of the board (second board) 105 having a thickness of 140 micrometers, portions other than the reinforcing bar 101 and the frame 103 that form a skeletal frame of the torsion bar 97, the vibrating plate 100 on which the flat coil 99 is formed, and the movable unit 96 are pierced to the oxide film through a dry process of plasma etching. Next, from a front surface side of the board (first board) 106 having a thickness of 60 micrometers, portions other than the movable mirror 102 and the frame 104 are pierced to the oxide film through anisotropic etching by using potassium hydroxide solution or the like. Finally, the oxide film surrounding the movable unit 96 is removed and separated to form the mirror unit 91.

The widths of the torsion bar 97 and the reinforcing bar 101 are assumed to be 40 micrometers to 60 micrometers. As explained above, a moment of inertia I of the movable unit 96 is preferably small for large vibrations angle of the movable unit 96, that is, the deflection plane 95. By contrast, since the deflection plane 95 is deformed with inertial force, the movable unit 96 has a lightened configuration in the present embodiment.

Furthermore, on the surface of the board 106 having a thickness of 60 micrometers including the surface of the movable mirror 102, the deflection plane 95 is formed through vapor deposition of an aluminum thin film. On the surface of the board 105 having a thickness of 140 micrometers, the flat coil 99, terminals 107 wired via the torsion bar 97, and a trimming patch 108 are formed with a copper thin film. As a matter of course, the configuration can be such that a thin-film permanent magnet is provided on the vibrating plate 100 side and the flat coil 99 is formed on a side of the frame 104.

The mirror unit 91 is mounted on the seat 92 with the front of the deflection plane 95 upward. In the mirror unit 91, with a current flowing across the terminals 107, a Lorentz force occurs at each side parallel to the torsion bar 97 of the flat coil 99, thereby causing the torsion bar 97 to be twisted to cause a rotary torque for rotating the movable unit 96, that is, the deflection plane 95. When the current is cut out, due to the resilience of the torsion bar 97, the movable unit 96 returns to a position on the same plane on which the frame 98 falls.

Therefore, by alternately switching the direction of the current flowing through the flat coil 99, the movable mirror 102 can be vibrated in a reciprocating manner. Also, the deflector 39, that is, the vibrating mirror 85 and the semiconductor lasers 51 and 52 of the light-source units 48 and 49 in the light-source unit 36 are arranged so that the normal line to the deflection plane 95 of the mirror unit 91 is positioned on the same plane as that of the optical axes of the light beams 59, 60, 61, and 62.

The driving circuit applies an alternating voltage or a pulse-wave voltage to the flat coil 99 formed on the back side of the mirror unit 91 so that the current flowing direction is alternately switched. With this, a gain of the current flowing through the flat coil 99 is adjusted so that the vibrating angle of the movable unit 96 is constant.

The deflector 39 is housed in the second housing and causes the light beams 59, 60, 61, and 62 to travel from the cylindrical lens 38 to the deflection plane 95. The deflector 39 then deflects the light beams 59, 60, 61, and 62 converging on the deflection plane 95 and emits them toward the second scanning lens 116, which will be explained further below, in the image-forming optical system 32. At this time, the light beams 59, 60, 61, and 62 after deflected on the deflection plane 95 enter the second scanning lens 116 as being spaced apart from each other so as to be separated from each other. The deflector 39 is housed in the second housing and blocked from outside air, thereby preventing a change in amplitude due to convection of outside air.

The light-source device 31 explained above emits the light beams 59, 60, 61, and 62 from the semiconductor lasers 51 and 52 of the light-source units 48 and 49 toward the second scanning lens 116. The light-source device 31 is housed in the first housing that is housed in the main housing.

The image-forming optical system 32 includes, as shown in FIGS. 2 and 3, one second scanning lens 116, four first scanning lenses 117Y, 117M, 117C, and 117K, and a plurality of reflection mirrors 118. The second scanning lens 116 is a so-called an f-arcsin lens, being formed in its longitudinal direction in a bar shape parallel to a longitudinal direction of the photosensitive drums 8Y, 8M, 8C, and 8K and being fixed by a housing adhesive or the like.

The second scanning lens 116 is formed in a convex shape with its center portion in the main scanning direction Y being away from the light-source device 31. The second scanning lens 116 has all of the light beams 59, 60, 61, and 62 passing therethrough and does not have a converging force in the sub-scanning direction Z. The second scanning lens 116 is arranged so that its reference axis (optical axis) is positioned in (parallel to) a plane D including the normal line to the deflection plane 95 of the deflector 39 and the light beams 59, 60, 61, and 62 entering from both sides of the plane D including the normal line to the deflection plane 95 enter symmetrically to the plane D. Hereinafter, a plane including the normal line to the deflection plane 95 and the reference axis of the second scanning lens 116 is referred to as the reference plane D.

The first scanning lenses 117Y, 117M, 117C, and 117K are provided in a one-to-one correspondence with the photosensitive drums 8Y, 8M, 8C, and 8K. The first scanning lenses 117Y, 117M, 117C, and 117K are each formed in a bar shape parallel to the longitudinal direction of the photosensitive drums 8Y, 8M, 8C, and 8K. The first scanning lenses 117Y, 117M, 117C, and 117K each allow only one of the light beams 59, 60, 61, and 62 with which the external surface of the relevant one of the photosensitive drums 8Y, 8M, 8C, and 8K is scanned passing therethrough.

The first scanning lenses 117Y, 117M, 117C, and 117K are provided in an tilted (inclined) state with a plane of incidence side being nearer the reference plane D than a plane of emission, so that the reference axis matches a main light beam of the light beams 59, 60, 61, and 62 reaching with its reference axis having an image height of 0, that is, so that an angle of the incident light beams 59, 60, 61, and 62 with respect to the reference plane D matches an angle of the reference axis with respect to the reference plane D. The first scanning lenses 117Y, 117M, 117C, and 117K are formed in the same shape. The first scanning lenses 117Y, 117M, 117C, and 117K corresponding to the light beams 59, 60, 61, and 62 passing through the opposite side of the reference plane D are arranged symmetrically to the reference plane D.

The plane of incidence of the first scanning lens 117Y, 117M, 117C, and 117K explained above are each formed in an approximately-flat special troidal plane, which will be explained further below, along a direction orthogonal to the reference axis. The plane of emission of the first scanning lens 117Y, 117M, 117C, and 117K are each formed in a special tilt-decentered plane, which will be explained further below.

Each of the reflection mirrors 118 is a strip-shaped plate that is arranged in a manner that a longitudinal side of the reflection mirror 118 is parallel to the longitudinal direction of the photosensitive drums 8Y, 8M, 8C, and 8K. The reflection mirrors 118 are arranged at portions as appropriate so as to guide the light beams 59, 60, 61, and 62 passing through the second scanning lens 116 to the external surface of the photosensitive drums 8Y, 8M, 8C, and 8K through the first scanning lenses 117Y, 117M, 117C, and 117K.

Two reflection mirrors 118 are provided for the light beam 59 that is outer side (on a side away from the reference plane D) from among the light beams 59 and 60 entering from one side of the reference plane D, that is, from the area A, whilst three reflection mirrors 118 are provided for the light beam 60 that is inner side (near the reference plane D). One reflection mirror 118 is provided for the light beam 62 that is outer side (on a side away from the reference plane D) from among the light beams 61 and 62 entering from the other side of the reference plane D, that is, from the area B, whilst two reflection mirrors 118 are provided for the light beam 61 that is inner side (near the reference plane D). In this manner, in each of the areas A and B, a difference between the number of reflection mirrors for the light beam 59 and the number of reflection mirrors for the light beam 60 and a difference between the number of reflection mirrors for the light beam 61 and the number of reflection mirrors for the light beam 62 are an odd number (one, in the present embodiment). Thus, the reflection mirrors 118 guiding the light beams 59, 60, 61, and 62 on one side (area A or B) of the reference plane D in the direction X to the external surface of the photosensitive drums 8Y, 8M, 8C, and 8K are provided so that a difference in number of reflection mirrors among the light beams 59, 60, 61, and 62 is an odd number. The light beams 59, 60, 61, and 62 in FIG. 3 are those after deflection. Therefore, the incident light beams 59, 60, 61, and 62 enter the reflection mirrors 118 from a side opposite to the area A or B before deflection.

The first scanning lenses 117Y, 117M, 117C, and 117K explained above and the reflection mirrors 118 are housed in the first housing.

Figure 12:
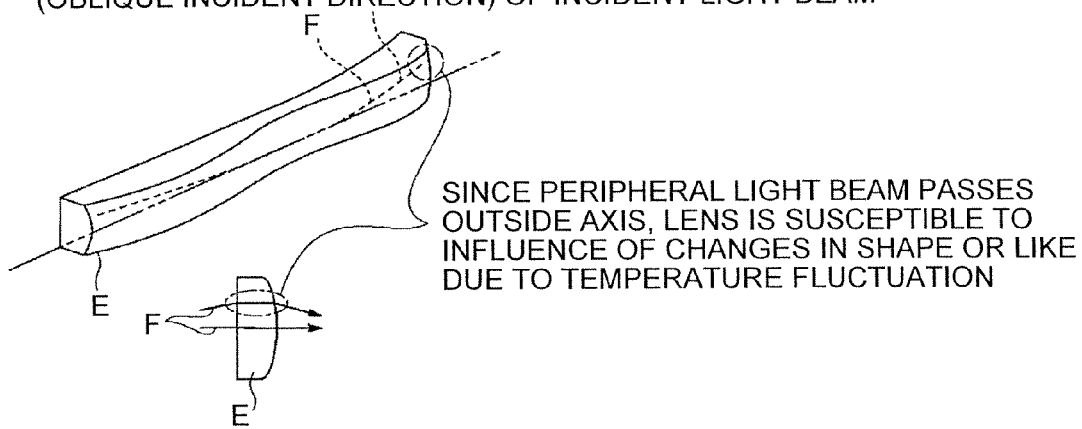
FIG. 12 is a perspective view of a scanning lens of the optical scanning device.

For example, in a scanning lens forming a scanning optical system, such as the first scanning lenses 117Y, 117M, 117C, and 117K explained above, in particular, in a scanning lens E having strong refractive power in the direction X, unless the shape of the plane of incidence in the main scanning direction Y, as shown in FIG. 12, is an arc shape centering a reflection point of a light beam F of the deflection plane 95, the distance from the deflection plane 95 of the deflector 39 to the plane of incidence of the scanning lens E is varied if the position in the main scanning direction Y is varied. Normally, it is difficult to make the scanning lens E in the above-mentioned shape in keeping optical performance.

That is, as shown in FIG. 12, the normal light beam F is subjected to deflection and scanning by the deflector 39. In each image height, in main-scanning cross-section, the light beam F does not vertically enter the plane of incidence of the scanning lens E but enters with a certain incident angle in the main scanning direction Y.

With the light beam F from the light source entering the deflection plane 95 with an angle in the direction X (due to oblique incidence), as for the light beam F deflected by the deflector 39, the distance from the deflection plane 95 of the deflector 39 to the plane of incidence of the scanning lens E is varied due to the image height. As shown in FIG. 12, as the height of the plane of incidence of the scanning lens E in the direction X is closer to the periphery, the light beam enters a position higher or lower than the center (this depends on the direction of the angle of the light beam F in the direction X). As a result, when the light beam F passes the plane of emission with refracting force in the direction X, the refracting force received in the direction X is varied, thereby causing a curve in a scanning line. In the case of normal horizontal incidence, even if the distance from the deflection plane 95 to the plane of incidence of the scanning lens E is varied, the light beam F advances horizontally to the scanning lens E. Therefore, the incident position on the scanning lens E in the direction X is not varied, thereby not causing a curve in a scanning line.

Furthermore, fluctuations in curve in a scanning line depending on the temperature are explained. In recent years, in view of cost and flexibility of the lens shape at the time of designing for the purpose of increasing image quality (such as an aspheric shape), plastic is generally used as the material of the scanning lens E. Therefore, changes in lens shape due to temperature changes are larger compared with those of a glass lens.

As explained above, in the oblique-incident-type optical system, the light beam F enters the scanning lens E as being curved in the direction X. Therefore, when the radius of curvature and thickness of the scanning lens E, the incident angle of the light beam F entering the scanning lens E, and the position in the direction X are changed due to temperature changes, different refracting changes occurs in the main scanning direction Y, thereby causing a curve in a scanning line. As explained above, in the case of normal horizontal incidence, even if the distance from the deflection plane 95 to the plane of incidence of the scanning lens E is varied, the light beam F advances horizontally to the scanning lens E. Therefore, the incident position on the scanning lens E in the direction X is not varied and is approximately equal to the height of the optical axis. Thus, the occurrence of curve in a scanning line is extremely small. That is, since the light beam F passes on the generatrix in the horizontal incident type, even if the radius of curvature is changed due to temperature changes, refraction of the light beam F in the direction X does not occur (or only a slight refraction may occur), although the image-forming position (defocus direction) is changed. Therefore, changes in curve in a scanning line (shift in position of the scanning line in the sub-scanning direction on the scan target surface) are extremely small.

As explained above, the occurrence of large curve in a scanning line is a problem unique to the oblique-incident-type optical system, and its direction of the curve is varied between both sides of the direction X across the normal line to the deflection plane. That is, the direction of the curve for the light beams 59 and 60 entering from the area A in FIG. 3 is inversed to that for the light beams 61 and 62 entering from the area B in FIG. 2. This is because the direction of the curve of the scanning line entering the scanning lens E is inversed depending on the direction of the incident angle of the light beam F entering the scanning lens E in the direction X, that is, the direction of oblique incidence (whether incidence from the area A or incidence from the area B in the drawings). In particular, the curve of the scanning line entering the scanning lens E having strong refracting power in the direction X causes a scanning line to be curbed, and the reason for this is as explained above.

Similarly, even when a temperature change occurs, a change in curve in a scanning line is inversed between both sides of the direction X across the normal line to the deflection plane 95. In this manner, when the direction of the curve in a scanning line is inversed on different scan target surfaces, superposition of respective colors causes a color shift, thereby significantly deteriorating color image quality.

Because the plane of incidence is approximately flat and the plane of emission is a special tilt-decentered plane, a color shift can be reduced. With this arrangement, the first scanning lenses 117Y, 117M, 117C, and 117K forms, when a virtual light beam G1 passing the center between the light beams 59 and 60 in the area A (represented by a one-dot-chain line in FIG. 3) or another virtual light beam G2 passing the center between the light beams 61 and 62 in the area B (represented by a one-dot-chain line in FIG. 3) enters, an image straightly on the external surface of each of the photosensitive drums 8Y, 8M, 8C, and 8K (not shifted in the direction X). That is, the first scanning lenses 117Y, 117M, 117C, and 117K are arranged so that an image is formed straightly when the virtual light beam G1 and the virtual light beam G2 passing the center between the two of the light beams 59, 60, 61, and 62 enters from the same side of the reference plane D. As a result, the first scanning lenses 117Y, 117M, 117C, and 117K are arranged so that the directions of the curves in scanning lines of the two of the light beams 59, 60, 61, and 62 entering from the same side of the reference plane D, which is a plane including the normal line to the deflection plane 95 are different (opposite) from each other and the amounts of the curves in scanning lines are approximately equal to each other.

Figure 8A:
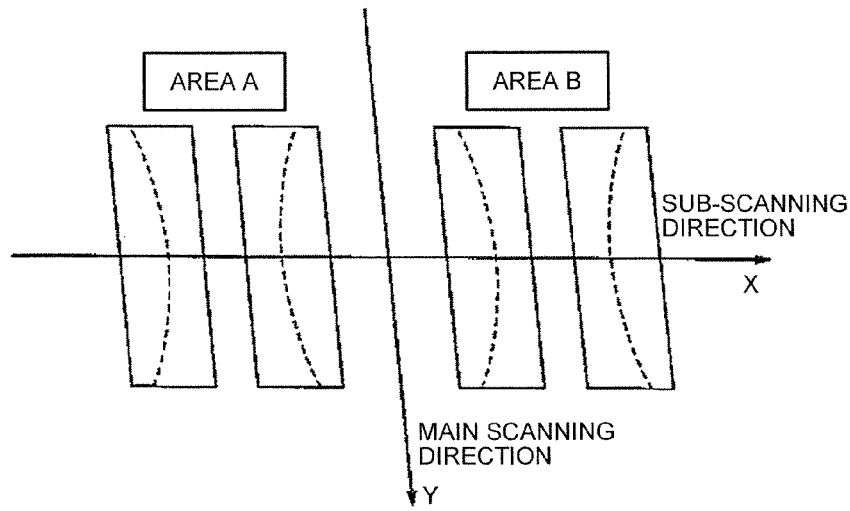
FIG. 8A is a schematic diagram for explaining curves in scanning lines of the light beams emitted from a second scanning lens of the laser writing unit shown in FIG. 3.
Figure 8B:
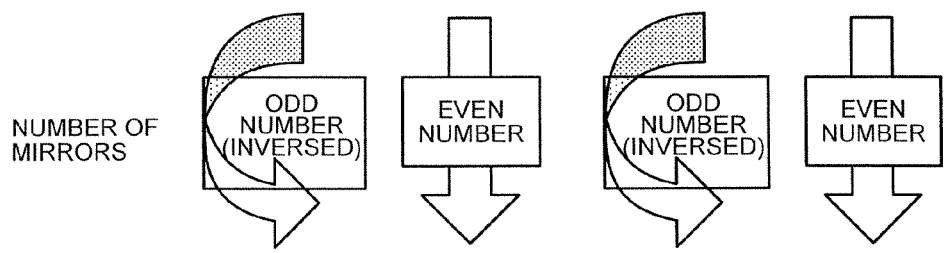
FIG. 8B is a schematic diagram for explaining a state where the light beams shown in FIG. 8A are reflected by reflection mirrors of the laser writing unit.
Figure 8C:
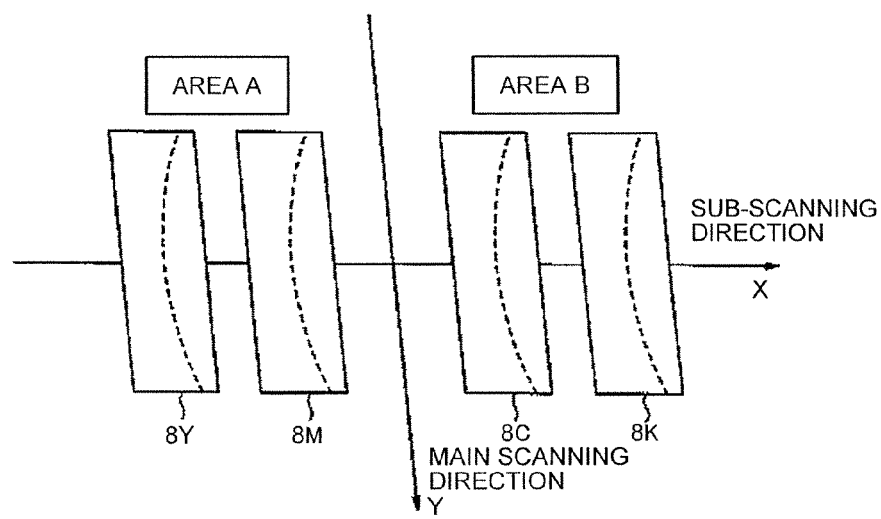
FIG. 8C is a schematic diagram for explaining curves in scanning lines of the light beam shown in FIG. 8B on the external surfaces of the photosensitive drums.

Also, to reduce a color shift, the difference in the number of reflection mirrors 118 between two of the light beams 59, 60, 61, and 62 entering from the same side of the reference plane D, which is a plane including the normal line to the deflection plane 95 is an odd number. Since the scanning line folded by the reflection mirror 118 in the direction X is inversed in the direction X, by using an appropriate number of reflection mirrors 118 as explained above, even when the direction of occurrence of curve in a scanning line is varied between both sides of the direction X, the direction can be adjusted to the same direction, as shown in FIGS. 8A to 8C. As a result, in color superposition in a color machine, the occurrence of color shift can be reduced, thereby achieving an excellent color image.

As for a curve in a scanning line, as the oblique incident angle (the incident angle of the light beam F with respect to the deflection plane 95 in the direction X) is larger, the curvature of the scanning line entering the scanning lens E is larger and the amount of occurrence is larger. That is, in the present embodiment, the amount of occurrence of curve in a scanning line of two outer light beams 59 and 62 on a side away from the reference plane D is larger than that of two inner light beams 60 and 61 near the reference plane D. Also, the amount of occurrence of curve in a scanning line of the outer light beams 59 and 62 at the time of temperature fluctuations is larger than that of the inner light beams 60 and 61.

Therefore, the curves in scanning lines of the light beams 59, 60, 61, and 62 entering from the same direction of the reference plane D in the direction X are in different directions. Therefore, the difference in the number of reflection mirrors 118 corresponding to the light beams 59, 60, 61, and 62 entering the reference plane D from the same direction in the direction X is an odd number. Thus, the directions of occurrence of curve in a scanning line on the external surface of the photosensitive drums 8Y, 8M, 8C, and 8K as scan target surfaces of the light beams 59, 60, 61, and 62 entering the reference plane D from the same direction in the direction X can match each other, thereby suppressing the occurrence of color shift.

In particular, when the image forming apparatus 1 is a tandem-color type, as explained above, inversely curves in scanning lines occur among the light beams 59, 60, 61, and 62 entering from the opposite side of the reference plane D. Therefore, the number of reflection mirrors 118 is set to be an odd number between the outer light beams 59 and 62 and between the inner light beams 60 and 61.

A special tilt-decentered plane is explained below in which the scanning line curves of the light beams 59, 60, 61, and 62 entering the reference plane D in the same direction in the direction X are in different directions from each other.

The special tilt-decentered plane is formed so as not to have a curvature in the direction X and so that a tilt angle in the direction X is varied according to the position in the main scanning direction Y and also the amount of deflection of the first scanning lenses 117Y, 117M, 117C, and 117K on the reference axis is zero. In the special tilt-decentered plane, its tilt amount is determined depending on lens height. Since the amount of curve of the first scanning lenses 117Y, 117M, 117C, and 117K on the plane of incidence is proportional to the magnitude of an oblique incident angle, it is impossible to completely correct the curves in scanning lines of the light beams 59, 60, 61, and 62 obliquely entering at different angles by using the same lens plane.

Figure 9A:
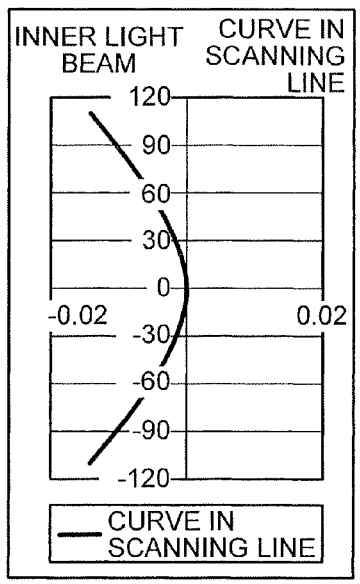
FIG. 9A is a graph for explaining a curve in a scanning line of an inner light beam outside a first scanning lens of the laser writing unit shown in FIG. 2.
Figure 9B:
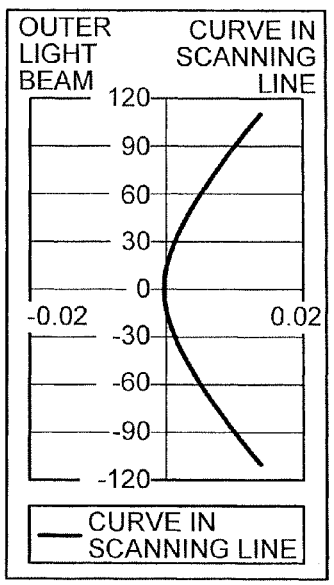
FIG. 9B is a graph for explaining a curve in a scanning line of an external light beam of the first scanning lens of the laser writing unit shown in FIG. 2.
Figure 9C:
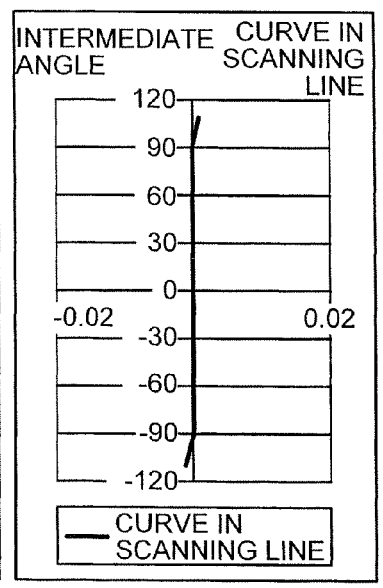
FIG. 9C is a graph for explaining a curve in a scanning line of a virtual light beam of the first scanning lens of the laser writing unit shown in FIG. 2.
Figure 9D:
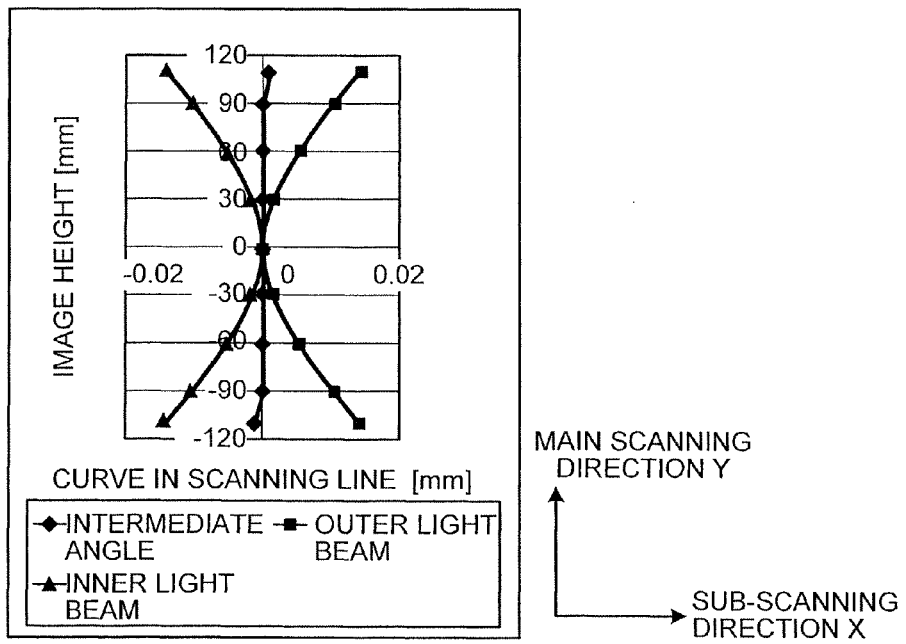
FIG. 9D is a graph for explaining a state where the states in FIGS. 9A to 9C are superposed on each other.

Therefore, an adjustment is made by, for example, bending the first scanning lenses 117Y, 117M, 117C, and 117K in the sub-scanning direction when the first scanning lenses 117Y, 117M, 117C is attached to the first housing. As shown in FIGS. 9C and 9D, the first scanning lenses 117Y, 117M, 117C, and 117K are formed so that the curves in scanning lines are optimally corrected with respect to the virtual light beams G1 and G2 obliquely entering at an approximately intermediate angle between two types of oblique incident angle. With this, as shown in FIGS. 9A, 9B, and 9D, curves in scanning lines with an approximately the same degree and in opposite directions are generated for both of the outer light beams 59 and 62 and the inner light beams 60 and 61 (in an example, the curve is approximately 15 micro meters).

This correction can be made by using a special tilt-decentered plane, which will be specifically explained further below, and also can be made by using a generatrix curved plane in which a cross-section shape along the direction X is an arc and a generatrix connecting vertexes of the arc is curved in the direction X.

The remaining curve in a scanning line is sufficiently small even with the use of the special tilt-decentered plane explained above. Therefore, by appropriately setting the adjustment and the number of reflection mirrors, the state can be kept at a level where a color shift is hard to detect. Also, on the reference axis of the first scanning lenses 117Y, 117M, 117C, and 117K, the light beams 59, 60, 61, and 62 substantially matches with each other. Therefore, refraction due to the first scanning lenses 117Y, 117M, 117C, and 117K does not occur to the main light beam of the light beams. Thus, the tilt amount of the first scanning lenses 117Y, 117M, 117C, and 117K on the reference axis is zero or approximately zero.

Deterioration in wave aberration due to oblique incidence is explained below. As explained above, unless the shape of the plane of incidence of the scanning lens E configuring an oblique incident optical system in the main scanning direction Y is an arc shape centering a reflection point of the light beam F on the deflection plane 95, the distance from the deflection plane 95 of the deflector 39 to the plane of incidence of the scanning lens E is varied if the position in the main scanning direction Y is varied. Normally, making the scanning lens E into the shape mentioned above is difficult in keeping optical performance. That is, the normal light beam F is subjected to deflection and scanning by the deflector 39, and then enters in cross section in the main scanning direction Y for each image height with an incident angle in the main scanning direction Y, but does not vertically enter the plane of incidence of the scanning lens E.

The light beam E deflected by the deflector 39 has a width in the main scanning direction Y. Between both ends of the light beam F in the main scanning direction Y, the distance from the deflection plane 95 of the deflector 39 to the plane of incidence of the scanning lens E is difference from each other, and these ends have an angle in the direction X (the light beam E obliquely enters). Therefore, the light beam E enters the scanning lens E in a twisted state. As a result, wave aberration significantly deteriorates, thereby increasing the light beam spot diameter. The incident angle in the main scanning direction Y is severer for a more peripheral image height, the twist of the light beam F is increased, and the light beam spot diameter due to deterioration in wave aberration is increased for a more peripheral portion.

With the plane of emission of the second scanning lens 116 and the planes of incidence of the first scanning lenses 117Y, 117M, 117C, and 117K being special troidal planes, wave aberration and curves in scanning lines are corrected. Also, the curves in scanning lines can also be corrected by tilt-deflecting the plane of emission in the direction X By balancing between the scanning position in the direction X between image heights and the amount of deteriorated wave aberration, the scanning position at each image height and wave aberration are corrected, and also the curve in a scanning line on the scan target surface and an increase in light beam spot diameter due to deterioration in wave aberration are corrected.

However, the amount of deterioration in wave aberration due to a twist (skew) of a light beam entering the plane of emission, the amount of change in object point in the direction X between image heights due to oblique incidence into a rotational polygon mirror, and the distance from the deflection plane 95 to the plane of emission are varied among the image heights. Therefore, wave aberration and curves in scanning lines cannot be corrected completely.

Therefore, the plane of incidence and the plane of emission of the second scanning lens 116 and the planes of incidence of the first scanning lenses 117Y, 117M, 117C, and 117K are special troidal planes in which the curvature in the direction X is varied depending on the image height and, furthermore, the paraxial curvature in the direction X is zero or approximately zero, thereby correcting wave aberration. Such a special troidal plane is defined by Equation 1, which will be explained further below (where F=0).

The paraxial curvature in the direction X is zero because deterioration in wave aberration due to a twist (skew) of the incident light beams 59, 60, 61, and 62 is small near the reference axis of each of the second scanning lens 116 and the first scanning lenses 117Y, 117M, 117C, and 117K. The reference axis of each of the second scanning lens 116 and the first scanning lenses 117Y, 117M, 117C, and 117K indicates a line connecting origins of Equations representing the shape. Also, with such a flat configuration, the image-forming optical system 32 becomes an optical system in which fluctuations in performance are small even with the occurrence of deflection at the time of assembling or the like. More preferably, the special troidal plane is provided on the deflector 39 side from the first scanning lenses 117Y, 117M, 117C, and 117K with the largest refracting power in the direction X.

A significant deterioration of wave aberration occurs due to the light beam is twisted at the time of incidence to the first scanning lenses 117Y, 117M, 117C, and 117K particularly with strong refracting power in the direction X. Therefore, for correcting wave aberration, it is required to correct an incident height to the first scanning lenses 117Y, 117M, 117C, and 117K with strong refracting power in the direction X, thereby light-gathering at one point on the scan target surface. When wave aberration is corrected on a special troidal plane, the incident height to the first scanning lenses 117Y, 117M, 117C, and 117K is increased. Also for both ends of the light beams 59, 60, 61, and 62 in the main scanning direction, the incident height to the first scanning lenses 117Y, 117M, 117C, and 117K having stronger refracting power in the direction X for a more peripheral portion is increased, thereby making correction possible.

That is, on the second scanning lens 116 on the deflector 39 side from the first scanning lenses 117Y, 117M, 117C, and 117K having the strongest refracting power in the direction X, a special troidal plane is formed so that negative power is increased more for a more peripheral portion with respect to the light beams 59, 60, 61, and 62 having an angle in the direction X with respect to the normal line to the deflection plane 95 of the deflector 39. Also, the positions incident in the direction X to the first scanning lenses 117Y, 117M, 117C, and 117K having strong refracting power in the direction X is adjusted, thereby correcting deterioration in wave aberration. Therefore, the special troidal plane for use in correcting wave aberration is preferably provided on a lens, such as the second scanning lens 1169 on the deflector 39 side from the first scanning lenses 117Y, 117M, 117C, and 117K having the strongest refracting power in the direction X.

In this manner, wave aberration is corrected on the special troidal plane, such as the second scanning lens 116 near the deflector 39 (at least a scanning lens on the deflector 39 side from the first scanning lenses 117Y, 117M, 117C, and 117K having strong refracting power in the direction X), and the curves in scanning lines are corrected with the special tilt-decentered planes of the first scanning lenses 117Y, 117M, 117C, and 117K near the scan target surface (scanning lenses having strong refracting power in the direction X). In this manner, by separating the correction functions, the spot diameter of each of the light beams 59, 60, 61, and 62 can be further reduced, and the curves in scanning lines can also be reduced. As a matter of course, these functions are not necessarily completely separated. Needless to say, for each special plane, part of wave-aberration correction or part of curve in a scanning line correction may be performed.

The planes of emission of the first scanning lenses 117Y, 117M, 117C, and 117K are each in a shape without a curvature in cross section in the direction X, and also are special tilt-decentered planes each with a different deflection angle (tilt amount) in a lateral direction (direction X) according to the position in a longitudinal direction (main-scanning direction Y). With this, wave aberration and the curves in scanning lines are corrected. The tilt amount (deflection angle) of the special tilt-decentered plane means a tilt angle in the lateral direction on an optical plane of an optical element. When the tilt amount is 0, the state is such that no tilt is present, that is, the state is identical to the state of the normal lens.

The shape of the special tilt-decentered plane explained above is defined by the following Equation 1. However, in the present invention, the shape is not restrictively defined by the following Equation 1, but the same plane shape can be specified by using another equation.

A radius of paraxial curvature (curvature in the main scanning direction) in "main-scanning cross-section", which is a plain cross section parallel to the main scanning direction Y, is taken as $R_Y$. A distance from the optical axis in the main scanning direction Y is taken as Y. Higher-order coefficients are taken as A, B, C, D, ... A radius of paraxial curvature (curvature in the sub-scanning direction) in "sub-scanning cross-section" orthogonal to the main-scanning cross-section is taken as $R_Z$.

$$X(Y, Z) = \frac{C_m \cdot Y^2}{1 + \sqrt{1 - (1 + K) \cdot (C_m \cdot Y)^2}} + A_1 \cdot Y + \quad (1)$$

-continued
$$A_2 \cdot Y^2 + A_3 \cdot Y^3 + A_4 \cdot Y^4 + A_5 \cdot Y^5 + \cdots + A_{18} \cdot Y^{18} +$$
$$(F_0 + F_1 \cdot Y + F_2 \cdot Y^2 + F_3 \cdot Y^3 + F_4 \cdot Y^4 + F_5 \cdot Y^5 +$$
$$\cdots + F_{18} \cdot Y^{18}) \cdot Z + \frac{C_s(Y) \cdot Z^2}{1 + \sqrt{1 - (C_s(Y) \cdot Z)^2}}$$

where $C_m = 1/R_Y$ $C_s(Y) = 1/R_Z + B_1 \cdot Y + B_2 \cdot Y^2 + B_3 \cdot Y^3 + B_4 \cdot Y^4 + B_5 \cdot Y^5 + \ldots + B_{18} \cdot Y^{18}$ In Equation 1, $(F_0 + F_1 \cdot Y + F_2 \cdot Y^2 + F_3 \cdot Y^3 + F_4 \cdot Y^4 + \ldots + F_{18} \cdot Y^{18}) \cdot Z$ represents the tilt amount. If there is no tilt amount, $F_0, F_1, F_2, \ldots$ are all 0. If $F_1, F_2, \ldots$ are not 0, the tilt amount is changed in the main scanning direction Y (where B=0).

Furthermore, the reason why the shape of the special tilt-decentered plane in the direction X is a flat shape without a curvature is explained below.

If a curvature is provided in the direction X, the shape in the main scanning direction Y is significantly changed for each height in the direction X. When the incident positions of the light beams 59, 60, 61, and 62 are shifted in the direction X due to temperature fluctuations and error in assembling of optical elements, such as the semiconductor lasers 51 and 52, large magnification error fluctuations occur. In a full-color laser printer, the spot positions of the light beams 59, 60, 61, and 62 among the respective colors are shifted, thereby causing a color shift. To solve this problem, the plane shape of the special tilt-decentered plane in the direction X is a flat shape without a curvature, thereby reducing an error in shape in the main scanning direction Y for each height in the direction X. Also, magnification error fluctuations when the incident positions of the light beams 59, 60, 61, and 62 are shifted in the direction X can be reduced, thereby suppressing the occurrence of color shift.

In practice, with the use of the special tilt-decentered plane, the shape in the main scanning direction is changed depending on the height in the direction X, but it amount is subtle. Therefore, the amount of change in shape in the main scanning direction can be reduced compared with the case where a curvature is provided in the direction X. As a result, the difference in magnification fluctuations among the light beams 59, 60, 61, and 62 due to the occurrence of temperature distribution can be reduced. Thus, it is possible to reduce a color shift at an intermediate image height when synchronization is performed to match a writing start position and a writing end position each other among the light beams 59, 60, 61, and 62.

Figure 7A:
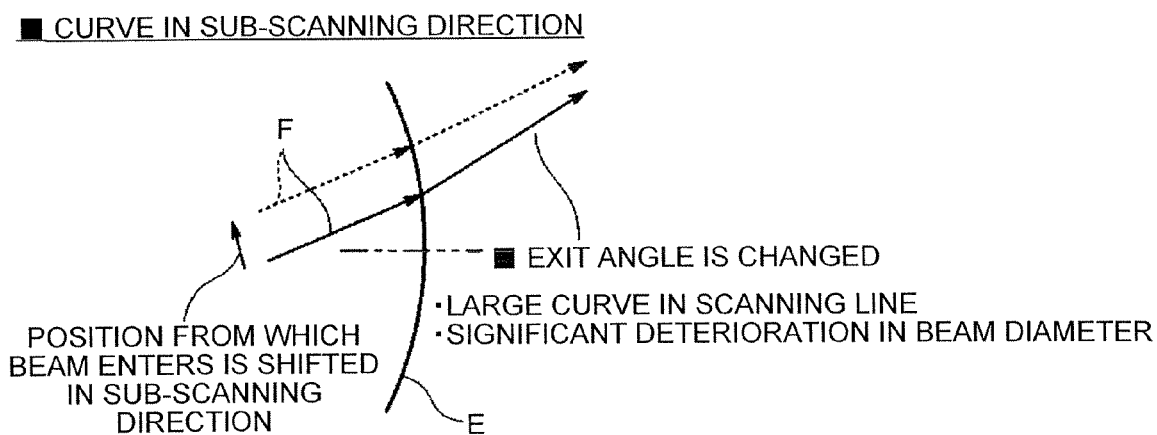
FIG. 7A is a schematic diagram for explaining a state where light beams enter a first scanning lens with its plane of incidence curved in a sub-scanning direction.
Figure 7B:
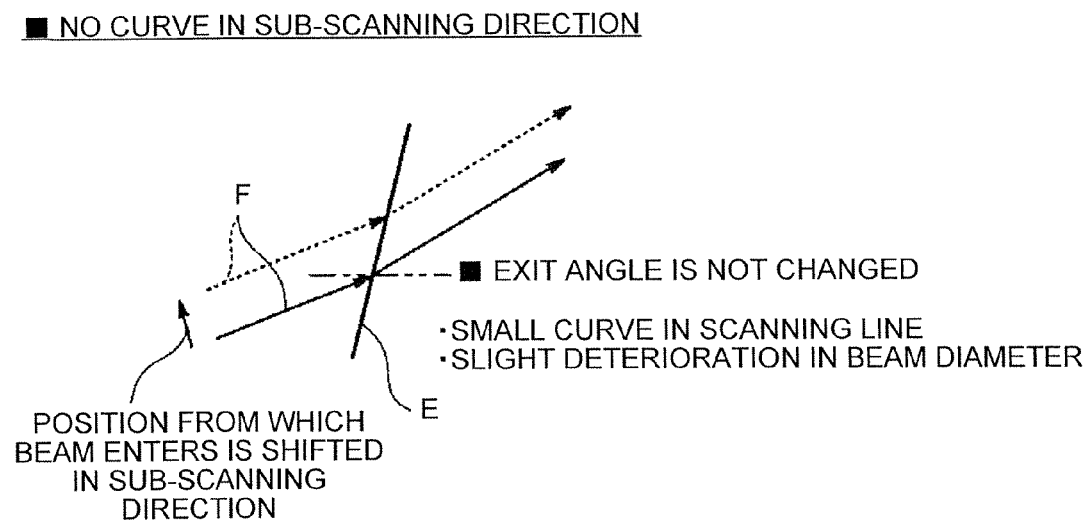
FIG. 7B is a schematic diagram for explaining a state where light beams enter the plane of incidence of the first scanning lens of the laser writing unit shown in FIG. 2.

Also, as shown in FIG. 7B, when a position from which the light beam F enters is shifted in the direction X, since the special tilt-decentered plane does not have refracting power, the traveling direction of the light beam F is merely shifted in parallel, and its change in direction is small. For a plane having a curvature in the direction X, that is, for a plane having refracting power, as shown in FIG. 7A, if a position from which the light beam F enters is shifted in the direction X, the traveling direction of the light beam F is changed due to the refracting power. Therefore, for the plane having a curvature, that is having refracting power, in the direction X, if the amount of change in this traveling direction for each image height is changed, a large curve in a scanning line occurs. Also, the light beam F is skewed, thereby causing deterioration in wave aberration and deterioration in light beam spot diameter. From these reason, the shape of the special tilt-decentered plane in the direction X is a flat shape without a curvature.

In the image-forming optical system 32, all of the light beams 59, 60, 61, and 62 enters the second scanning lens 116 from the deflection plane 95 of the vibrating mirror 85 in the light-source device 31. Of the light beams 59, 60, 61, and 62 passing through the second scanning lens 116 from the light-source units 48 and 49, the light beam 59 from the upper semiconductor laser 51 in the light-source unit 48 is reflected on the reflection mirror 118 to form a spot image on the photosensitive drum 8Y through the first scanning lens 117Y, thereby forming an electrostatic latent image based on image information of yellow color.

The light beam 60 from the lower semiconductor laser 52 in the light-source unit 48 is reflected on the reflection mirror 118 to form a spot image on the photosensitive drum 8M through the first scanning lens 117M and the reflection mirror 118, thereby forming an electrostatic latent image based on image information of magenta color.

The light beam 61 from the upper semiconductor laser 51 in the light-source unit 49 is reflected on the reflection mirror 118 to form a spot image on the photosensitive drum 8C through the first scanning lens 117C and the reflection mirror 118, thereby forming an electrostatic latent image based on image information of cyan color.

The light beam 62 from the lower semiconductor laser 52 in the light-source unit 49 is reflected on the reflection mirror 118 to form a spot image on the photosensitive drum 8K through the first scanning lens 117K and the reflection mirror 118, thereby forming an electrostatic latent image based on image information of black color.

In the laser writing unit 22, the four divergent light beams 59, 60, 61, and 62 emitted from the semiconductor lasers 51 and 52 of the light-source units 48 and 49 in the light-source device 31 are converted by a light beam shape suitable for the subsequent optical system at the coupling lenses 54 and 55. The coupling lenses 54 and 55 may covert the light beams to either one of parallel light, weak divergent light beams, and a weak convergent light beams. The light beams 59, 60, 61, and 62 emitted from the coupling lenses 54 and 55 converge by the cylindrical lens 38 in the direction X for incidence to the deflection plane 95 of the vibrating mirror 85.

These light beams 59, 60, 61, and 62 enter the deflection plane 95 of the vibrating mirror 85 with an angle in the direction X, that is, are tilted with respect to the reference plane D explained above. These light beams 59, 60, 61, and 62 are deflected on the deflection plane 95 of the vibrating mirror 85 toward the second scanning lens 116. At this time, the light beams 59, 60, 61, and 62 deflected with the deflection plane 95 are also tilted with respect to the reference plane D explained above. The light beams 59, 60, 61, and 62 entering the deflection plane 95 of the deflector 39 as being tilted with respect to the reference plane D may be caused to enter the deflection plane 95 of the deflector 39 by disposing the light-source units 48 and 49 and the incident mirror 37, and others as being tilted. Alternatively, the optical axis of the incident mirror 37 or the like, for example, may be shifted in position in the direction X to cause the light beams to enter the deflection plane 95 of the deflector 39.

The light beams 59, 60, 61, and 62 deflected with the deflection plane 95 are deflected at an equal angular velocity with vibrations of the movable unit 96, passing through the second scanning lens 116 and the first scanning lenses 117Y, 117M, 117C, and 117K to form a spot image on the external surfaces of the photosensitive drums 8Y, 8M, 8C, and 8K as scan target surfaces for scanning.

According to the present embodiment, the twist of the light beams 59, 60, 61, and 62 can be corrected by adopting a special troidal plane and optimally providing a tilt amount for each position of the first scanning lenses 117Y, 117M, 117C, and 117K in the main scanning direction Y. Similarly, as for the curve in a scanning line, the directions of the light beams 59, 60, 61, and 62 in the direction X toward each image height can be corrected by using a special troidal plane and optimally providing a tilt amount for each position of the second scanning lens 116 in the main scanning direction Y.

Also at this time, a deterioration in wave aberration due to an angle in the direction X for incidence is extremely small near the reference axis because a skew of each of the light beams 59, 60, 61, and 62 hardly occurs with respect to the first scanning lenses 117Y, 117M, 117C, and 117K. Therefore, in the special troidal plane in the present invention, the amount of deflection on the reference axis can be zero. Conventionally, when a lens or a lens plane is subjected to tilt deflection or shift deflection to correct wave aberration and curve in scanning lines, performance is deteriorated near a center image height to balance with peripheral image heights. In the present invention, such a deflection of a lens or lens plane is not required, thereby excellently correcting optical performance.

The special troidal plane explained above is optimally set for each of the light beams 59, 60, 61, and 62 toward different scan target surfaces, that is, for each angle (oblique incident angle) in the direction X with respect to the normal line to the deflection plane 95 of the deflector 39. With this, wave aberration and curve in scanning lines can be excellently corrected for all of the light beams 59, 60, 61, and 62. In this case, even with different oblique incident angles, the present special troidal planes are used to change coefficients in a shape equation for optimal designing.

Furthermore, the light beams 59, 60, 61, and 62 are caused to enter with an angle with respect to the reference axis of the second scanning lens 116 in the main scanning direction so that the light beams 59, 60, 61 and 62 entering the deflection plane 95 of the deflector 39 are not interfered by the second scanning lens 116, thereby setting a small incident angle to the deflection plane 95 in the direction X. If the angle for oblique incidence in the direction X is large, the deterioration in optical performance is large, thereby making an excellent correction difficult. Therefore, preferably, the light beams 59, 60, 61, and 62 are caused to enter the deflection plane 95 of the deflector 39 with an angle in the main scanning direction Y.

According to the present embodiment, the first scanning lenses 117Y, 117M, 117C, and 117K are arranged so as to form images on a straight line from the virtual light beams G1 and G2 passing through the light beams 59, 60, 61, and 62 on one side (area A or area B) of the reference plane D. Therefore, curve in scanning lines at the time of forming images from these light beams 59, 60, 61, and 62 can be minimized. Thus, a color shift can be minimized. Also, the first scanning lenses 117Y, 117M, 117C, and 117K forming images from the light beams 59, 60, 61, and 62 explained above are an identical type, thereby suppressing the number of types of component and reducing cost of the laser writing unit 22. Thus, the laser writing unit 22 with image quality equivalent to or higher than that of the conventional example can be provided even at low cost. With this arrangement, the image forming apparatus 1, such as a digital copier or a laser printer, can obtain image quality higher than ever can be achieved.

A difference in number of reflection mirrors 118 guiding the light beams 59, 60, 61, and 62 on one side (area A or area B) of the reference plane D in the direction X to the scan target surface is an odd number among the light beams 59, 60, 61, and 62. Thus, with the scanning directions of the light beams 59, 60, 61, and 62 on the scan target surface being curved in the same direction, a color shift can be more reliably suppressed. Furthermore, since the reflection mirrors 118 can be arranged as appropriate, flexibility in disposing the reflection mirrors 118 and the first scanning lenses 117Y, 117M, 117C, and 117K can be increased. Thus, the laser writing unit 22 with image quality equivalent to or higher than that of the conventional example and high flexibility in layout can be provided.

Since the second scanning lens 116 is used in common for all of the light beams 59, 60, 61, and 62, the number of components can be reduced, thereby providing the laser writing unit 22 at low cost. Therefore, the image forming apparatus 1, such as a digital copier or a laser printer, can be provided at lower costs.

Since the first scanning lenses 117Y, 117M, 117C, and 117K are arranged so as to form images on a straight line from virtual light beams G1 and G2 passing the center among the light beams 59, 60, 61, and 62 on one side (area A or area B) of the reference plane D, the curve in scanning lines at the time of forming images from the light beams 59, 60, 61, and 62 can be reliably minimized. With this arrangement, the laser writing unit 22 with a less color shift can be provided. Thus, the image forming apparatus 1, such as a digital copier or a laser printer, can obtain higher image quality.

Of the planes of incidence and the plane of emission of the first scanning lenses 117Y, 117M, 117C, and 117K, the plane of emission is a special tilt-decentered plane. Therefore, the first scanning lenses 117Y, 117M, 117C, and 117K can more excellently correct the curve in scanning lines, thereby more reliably minimizing the curve in scanning lines. Since the deflection amount on the reference axis on the special tilt-decentered plane is approximately zero, the shapes of the first scanning lenses 117Y, 117M, 117C, and 117K can be simplified, and also the curve in scanning lines can be more excellently corrected, thereby more reliably minimizing the curve in scanning lines.

The light-source unit 36 is provided so that the light beams 59, 60, 61, and 62 enter the deflector 39 with an angle in the direction X with respect to the normal line to the deflector 39. Therefore, the light beams 59, 60, 61, and 62 from the light-source unit 36 can be reliably caused to enter one deflector 39, thereby easily achieving colorization of the image forming apparatus 1 including the laser writing unit 22.

Since the vibrating mirror 85 is provided to the deflector 39, the deflector 39 can be downsized more than the case using a polygon mirror. With this, noise occurring when the deflector 39 deflects the light beams 59, 60, 61, and 62 can be suppressed, and also power saving can be achieved.

Since the light-source unit 36 emits the light beams 59, 60, 61, and 62. Therefore, in addition to easy colorization, downsizing can be achieved with one light-source unit 36 emitting the light beams 59, 60, 61, and 62.

Also, since the image forming apparatus 1 includes the laser writing unit 22 explained above, the curve in a scanning line can be minimized. With this, image quality can be increased with it performance equivalent to or higher than that of the conventional example.

Figure 13A:
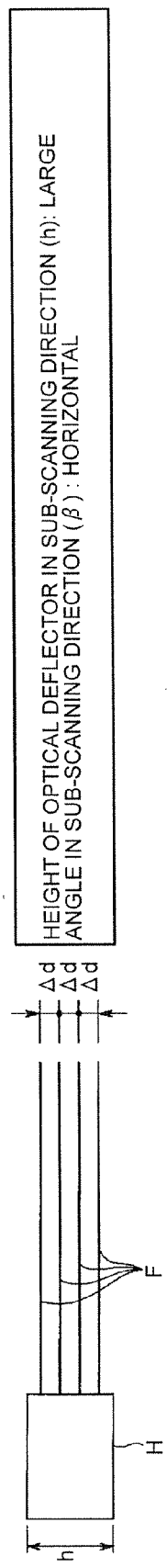
FIGS. 13A and 13B are side views of a conventional light-source device.

On the other hand, as a one-side scanning scheme not using oblique incidence, in a conventional light-source device H shown in FIG. 13A in which all of the light beams 59, 60, 61, and 62 are horizontal to the normal line to the deflection plane 95 of the deflector 39, excellent optical performance can be easily achieved, but each space between the light beams 59, 60, 61, and 62 guided to different scan target surfaces normally has to be 3 millimeters to 5 millimeters so as to be those required for separation for each of the light beams 59, 60, 61, and 62 (Dd in the drawing). For this purpose, the height (height in the direction X) of the deflector 39 (polygon mirror) is increased, thereby increasing a contact area of the deflector 39 with air to disadvantageously increase power consumption due to windage loss, noise, cost, and others. In particular, due to a high cost ratio of the deflecting unit in the components of the optical scanning device, the problem in cost is significant.

Figure 13B:
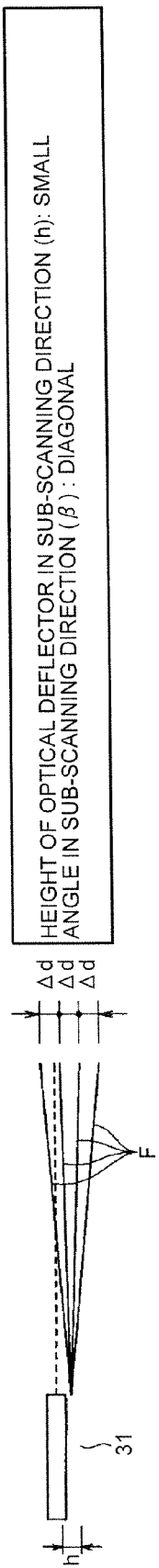

By contrast, according to the light-source device 31 of the laser writing unit 22 as the optical scanning device according to the present embodiment explained above (shown in FIG. 13B), the light beams 59, 60, 61, and 62 from the semiconductor lasers 51 and 52 reflected on the deflection plane 95 of the deflector 39 are caused to enter with an angle with respect to the normal line to the deflection plane 95 of the deflector 39 (with an angle in the direction X). With this, the height of the deflector 39 can be significantly reduced, thereby reducing the thickness of the deflection plane 95 of the deflector 39 in the direction X, reducing inertial force of the deflection plane 95, and also reducing a start-up time (allowing high-speed image formation).

The laser writing unit 22 as an optical scanning device according to a second embodiment of the present invention is explained with reference to FIGS. 10A to 10C. The plane of incidence and the plane of emission of the second scanning lens 116 are both formed as special troidal planes explained above, and the planes of emission of the first scanning lenses 117Y, 117M, 117C, and 117K are formed so as to be flat along a direction orthogonal to the reference axis of the first scanning lenses 117Y, 117M, 117C, and 117K. The planes of incidence of the first scanning lenses 117Y, 117M, 117C, and 117K are formed so as to be generatrix curved planes.

A generatrix curved plane is a plane in which a cross-section shape in the main scanning direction Y is an arc, and a generatrix connecting vertexes of the arc is curved in the direction X. Also in the present embodiment, the first scanning lenses 117Y, 117M, 117C, and 117K are formed so as to form images on a straight line from the virtual light beams G1 and G2 explained above.

Figure 10A:
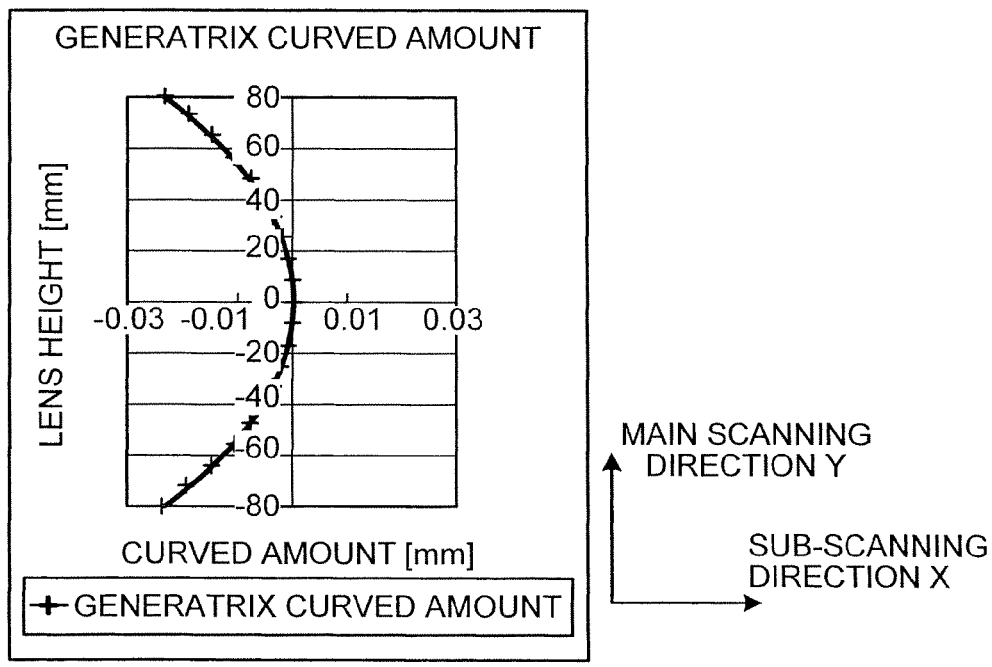
FIG. 10A is a graph for explaining a curved state of a generatrix of a first scanning lens of the laser writing unit according to a second embodiment of the present invention.
Figure 10B:
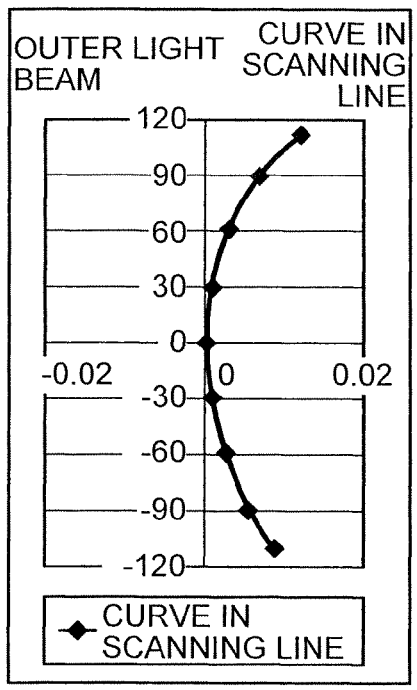
FIG. 10B is a graph for explaining a curve in a scanning line of an external light beam of the first scanning lens shown in FIG. 10A.
Figure 10C:
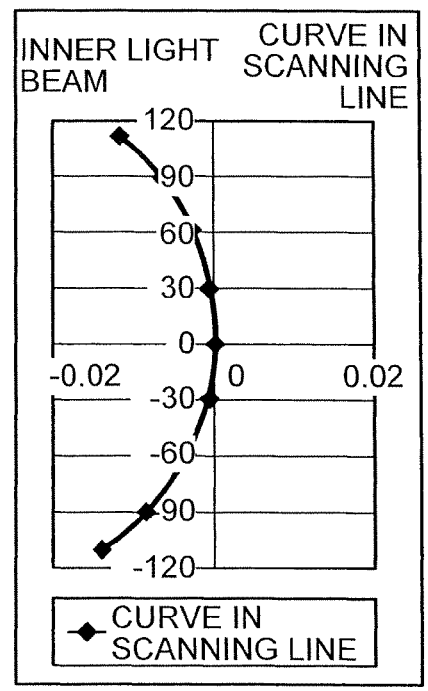
FIG. 10C is a graph for explaining a curve in a scanning line of an inner light beam of the first scanning lens shown in FIG. 10A.

FIGS. 10A to 10C are graphs for explaining a relation between the generatrix curved amount of the first scanning lenses 117Y, 117M, 117C, and 117K and curve in scanning lines on the plane of incidence. At the center, the curved amount is assumed to be 0, and the generatrix of the plane of incidence of the first scanning lenses 117Y, 117M, 117C, and 117K is curved to the reference plane D side as the lens height is increased so that the curve in scanning lines on the scan target surface of two of the light beams 59, 60, 61, and 62 entering the reference plane D from the same side are opposite in direction from each other and are approximately equal in magnitude to each other.

The generatrix curved plane explained above can be represented by the following Equation 2.

$$X(Y, Z) = \frac{C_m \cdot Y^2}{1 + \sqrt{1 - (1 + K) \cdot (C_m \cdot Y)^2}} + \quad (2)$$

$$A_1 \cdot Y + A_2 \cdot Y^2 + A_3 \cdot Y^3 + A_4 \cdot Y^4 + A_5 \cdot Y^5 +$$

$$\cdots + A_{18} \cdot Y^{18} + \frac{C_s(Y) \cdot (Z - Z_0(Y))^2}{1 + \sqrt{1 - C_s(Y)^2 \cdot (Z - Z_0(Y))^2}}$$

where $$C_m = 1/R_Y$$

$$C_s(Y) = 1/R_Z + B_1 \cdot Y + B_2 \cdot Y^2 + B_3 \cdot Y^3 + B_4 \cdot Y^4 + B_5 \cdot Y^5 + \ldots + B_{18} \cdot Y^{18}$$

$$Z_0(Y) = D_0 + D_1 \cdot Y^1 + D_2 \cdot Y^2 + D_3 \cdot Y^3 + D_4 \cdot Y^4 + D_5 \cdot Y^5 + \ldots + D_{18} \cdot Y^{18}$$

With the plane of incidence of each of the first scanning lenses 117Y, 117M, 117C, and 117K being the generatrix curved plane explained above, curves of the scanning lines on the scan target surface of two of the light beams 59, 60, 61, and 62 entering with respect to the reference plane D from the same side can be opposite in direction to each other. With this, the difference in the number of reflection mirrors 118 corresponding to two of the light beams 59, 60, 61, and 62 entering with respect to the reference plane D from the same side is an odd number. Thus, the directions of the curve in scanning lines on the scan target surface can match each other, thereby achieving a scanning optical system with less color shift and high flexibility in layout.

According to the present embodiment, of the planes of incidence and the planes of emissions of the first scanning lenses 117Y, 117M, 117C, and 117K, the planes of incidence are generatrix curved planes in which a cross-section shape in the sub-scanning direction X is an arc with its curvature being varied according to the position in the main scanning direction Y and a generatrix formed so as to include a vertex of the arc is curved in the direction X. Therefore, the first scanning lenses can more excellently correct the curve in scanning lines, thereby more reliably minimizing the curve in scanning lines. With this, the laser writing unit 22 with a smaller curve in a scanning line, that is, a smaller color shift, can be achieved, thereby achieving the image forming apparatus 1, such as a digital copier or a laser printer, with image quality higher than ever.

In the embodiments explained above, the deflector 39 includes the vibrating mirror 85. However, in the present invention, the deflector 39 may be a rotatable polygon mirror. In this case, the polygon mirror is preferably formed in a polyhedron provided with many deflection planes. Also in this case, as with the embodiment explained above, the light beams 59, 60, 61, and 62 are tilted, thereby downsizing the polygon mirror.

Figure 11A:
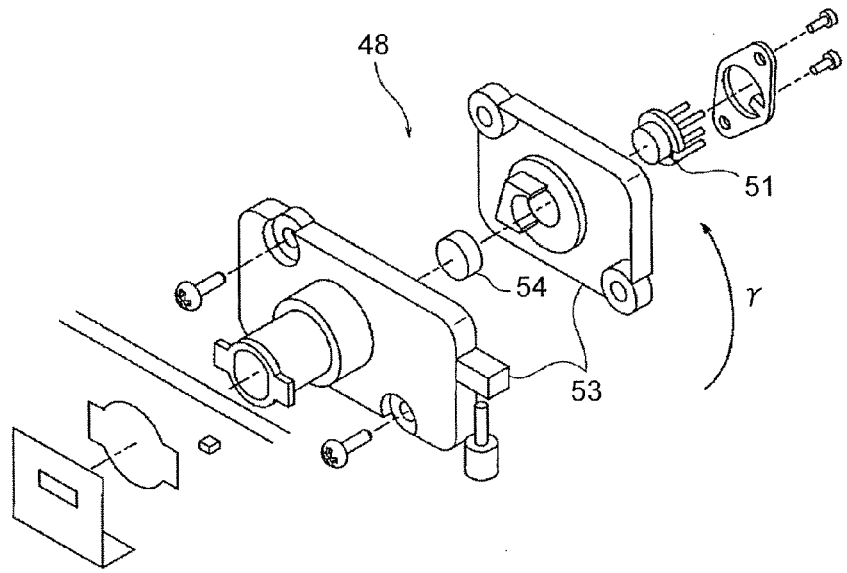
FIG. 11A is an exploded perspective view of the light-source unit shown in FIG. 4A.
Figure 11B:
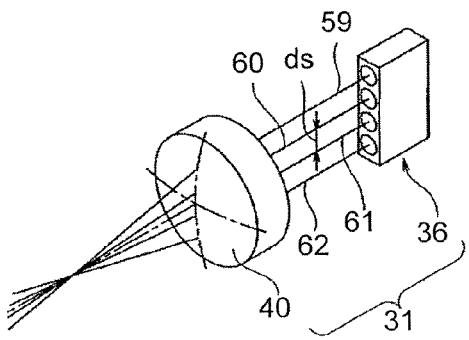
FIG. 11B is a perspective view of a light-source device configured of the light-source unit shown in FIG. 11A.

Also, in the present invention, only one semiconductor laser 51 may be mounted for each light-source unit 48 shown in FIG. 11A, and four such light-source units 48 may be provided in the direction X as shown in FIG. 11B to configure the light-source unit 36 explained above. Portions identical to those in the embodiment explained above are provided with the same reference numerals and are not explained herein. In this case, light beams from the semiconductor laser 51 as a light-emitting source of the four light-source units 48 are combined by using a light-beam combining unit 40 and are emitted toward the deflection plane 95, for example.

Furthermore, the first scanning lenses 117Y, 117M, 117C, and 117K are formed so as to form images on a straight line from the virtual light beams G1 and G2 passing through the center between the light beams 59 and 60 explained above and the virtual light beam F passing through the center between the light beams 61 and 62 explained above. However, in the present invention, the first scanning lenses 117Y, 117M, 117C, and 117K may be formed so as to form images on a straight line from a virtual light beam between the light beams 59 and 60 explained above but not passing through the center therebetween and a virtual light beam between the light beams 61 and 62 explained above but not passing through the center therebetween.

Still further, although four light beams 59, 60, 61, and 62 are provided in the embodiments explained above, the number of light beams can be arbitrary in the present invention.

Still further, to increase the speed of the laser writing unit 22 as the optical scanning device according to the present invention, at least one plane with a different curvature in the direction X according to the image height is preferably used as any of the first scanning lenses 117Y, 117M, 117C, and 117K nearest to the scan target surface. With such a configuration, in a scanning optical system with its magnification being approximately −0.5 in the embodiments explained above, a deviation in magnification between image heights can be reduced. Also, an effect of more excellently correcting an image plane curve in the direction X can be expected.

More preferably, the curvature in the direction X is varied asymmetrically to the main scanning direction Y centering the reference axis. In the laser writing unit 22 as the optical scanning device according to the embodiments explained above, the light beams 59, 60, 61, and 62 are caused to enter the deflector 39 with an angle in the main scanning direction Y. As a result, when a polygon mirror is used as the deflector 39, optical sag due to the rotational polygon mirror does not occurs symmetrically to the main scanning direction with respect to the reference axis of the second scanning lens 116. That is, the difference in optical path length of the second scanning lens 116 causing various aberrations is not bilaterally symmetrical to the center, and therefore various aberrations occurs in a bilaterally asymmetrical manner. With this configuration, an effective aberration correction can be made.

To further downsize and reduce cost of the laser writing unit 22 as the optical scanning device according to the present invention, the reflecting point of the deflection plane 95 of the deflector 39 and the incident point of the second scanning lens 116 nearest to the deflector 39 are preferably arranged so as to be orthogonal to the rotational axis of the deflector 39 and be opposite to each other with respect to a plane including the reference plane D of the second scanning lens 116.

In the optical scanning device according to the present invention, for more excellent wave aberration correction, at the first scanning lens E, the curvature in the direction X is preferably varied according to the image height so that negative power in the direction X is increased as the image height is higher.

As explained above, the incident angle to the first scanning lenses 117Y, 117M, 117C, and 117K in the main scanning direction Y is increased for a more peripheral image height, the twist of the luminance flux is increased, and an increase in the light beam spot diameter due to a deterioration of wave aberration is larger for a more peripheral image height.

A deterioration of wave aberration is increased due to the light beams 59, 60, 61, and 62 being twisted particularly at the time of entering the first scanning lenses 117Y, 117M, 117C, and 117K with strong refracting force in the direction X. For correcting wave aberration, therefore, the incident height to the first scanning lenses 117Y, 117M, 117C, and 117K with strong refracting force in the direction X has to be corrected, and the light beams have to be converged to one point on the scan target surface. When wave aberration is corrected with a special troidal plane, the incident height to the first scanning lenses 117Y, 117M, 117C, and 117K is increased and, also for the light beams at both ends of the light beams 59, 60, 61, and 62 in the main scanning direction Y, the incident height to the first scanning lenses 117Y, 117M, 117C and 117K having strong refracting force for a more peripheral portion in the direction X is increased. That is, a special troidal plane is formed as the second scanning lens 116 on the deflector 39 side from the first scanning lenses 117Y, 117M, 117C, and 117K having strongest refracting power in the direction X so that, for the light beams 59, 60, 61, and 62 having an angle in the sub-scanning direction X with respect to the normal line to the deflection plane 95 of the deflector 39, negative power is increased for a more peripheral portion. Also, the incident position to the first scanning lenses 117Y, 117M, 117C, and 117K having strong refracting force in the direction X is adjusted. With this, deterioration in wave aberration can be corrected. Therefore, the special troidal plane for use in correcting wave aberration is preferably provided on the second scanning lens 116 on the deflector 39 side from the first scanning lenses 117Y, 117M, 117C, and 117K having strongest refracting force in the direction X.

Furthermore, in the present invention, the reflection mirror 118 may be arranged in any manner without deviating from the gist of the present invention. Still further, although the planes of emission of the first scanning lenses 117Y, 117M, 117C, and 117K are assumed to be special tilt-decentered planes in the first embodiment explained above, the planes of incidence of the first scanning lenses 117Y, 117M, 117C, and 117K may be special tilt-decentered planes in the present invention. Although the planes of incidence of the first scanning lenses 117Y, 117M, 117C, and 117K are assumed to be generatrix curved planes in the second embodiment explained above, the planes of emission of the first scanning lenses 117Y, 117M, 117C, and 117K may be generatrix curved planes in the present invention.

Still further, the inventor of the present invention has manufactured the second scanning lenses 116 and the first scanning lenses 117Y, 117M, 117C, and 117K described in the embodiments explained above and confirmed the effects of the present invention.

A first example of the present invention is described below. The semiconductor lasers 51 and 52 that emit the light beams 59, 60, 61, and 62 having a wavelength of 780 nanometers were used. The scanning width in the main scanning direction was 220 millimeters. A polygon mirror with six deflection planes and an inradius of 13 millimeters was used as a deflector. The incident angle with respect to the polygon mirror was 60 degrees in main-scanning cross-section and 1.46 degrees and 3.30 degrees in sub-scanning cross-section. The sub-scanning lateral magnification of the scanning optical system was −0.49. The deflection range of the polygon mirror was ±23.4 degrees.

The plane of incidence and the plane of emission of the second scanning lens 116 and the planes of incidence of the first scanning lenses 117Y, 117M, 117C, and 117K were special troidal planes explained above. The planes of emission of the first scanning lenses 117Y, 117M, 117C, and 117K were special tilt-decentered planes explained above.

Also, a relative positional relation of the second scanning lenses 116 and the first scanning lenses 117Y, 117M, 117C, and 117K with respect to the inner light beams 60 and 61 and others were as represented in the following Table 1, whilst a relative positional relation of the second scanning lenses 116 and the first scanning lenses 117Y, 117M, 117C, and 117K with respect to the outer light beams 59 and 62 and others were as represented in the following Table 2.

TABLE 1

Inner light beam

| | $R_Y$ (mm) | $R_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.98 | 5.03 | — | |
| Plane of incidence | −580.000 | 34.800 | (3.00) | (0.00) | 1.5240 | First scanning lens |
| Plane of emission | ∞ | ∞ | 97.71 | — | — | |
| Plane of incidence | — | — | — | — | — | Scan target surface |

TABLE 2

Outer light beam

| | $R_Y$ (mm) | $R_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.90 | 11.50 | — | |
| Plane of incidence | −580.000 | 34.800 | (3.00) | (0.00) | 1.5240 | First scanning lens |
| Plane of emission | ∞ | ∞ | 97.58 | — | — | |
| Plane of incidence | — | — | — | — | — | Scan target surface |

In Tables 1 and 2, RY represents a curvature in a main scanning direction Y, RZ represents a curvature in a main scanning direction Y, X represents a distance to the next plane in the main scanning direction Y, Z represents a distance to the next plane in the direction X, and N represents a refractive index with respect to the light beams 59, 60, 61, and 62 having a designed wavelength.

Furthermore, parameters in Equation 1 for each type of the plane of incidence and the plane of emission of the second scanning lens 116 are represented in the following Table 3, whilst the parameters in Equation 1 for each type of the plane of incidence and the plane of emission of the first scanning lenses 117Y, 117M, 117C, and 117K are represented in the following Table 4.

TABLE 3

Aspheric coefficient (second scanning lens)

| | Plane of incidence | Plane of emission |
|---|---|---|
| $R_Y$ | −75.900 | −48.800 |
| K | 0.000E+00 | 0.000E+00 |
| A4 | −6.331E−07 | −2.120E−07 |
| A6 | 1.935E−09 | 7.447E−10 |
| A8 | −1.895E−12 | 1.787E−15 |
| A10 | 1.792E−16 | 4.771E−18 |
| A12 | −4.830E−18 | −4.624E−18 |
| $R_Z$ | ∞ | ∞ |
| B2 | 0.000E+00 | 9.334E−06 |
| B4 | 0.000E+00 | 2.558E−09 |

TABLE 3-continued

Aspheric coefficient (second scanning lens)

| | Plane of incidence | Plane of emission |
|---|---|---|
| B6 | 0.000E+00 | −1.465E−13 |
| B8 | 0.000E+00 | 6.376E−14 |
| B10 | 0.000E+00 | −8.426E−17 |
| B12 | 0.000E+00 | −3.471E−20 |

TABLE 4

Aspheric coefficient (first scanning lens)

| | Plane of incidence | Plane of emission |
|---|---|---|
| $R_Y$ | −580.000 | ∞ |
| K | 0.000E+00 | 0.000E+00 |
| A4 | 1.073E−07 | 0.000E+00 |
| A6 | −1.501E−11 | 0.000E+00 |
| A8 | 2.308E−15 | 0.000E+00 |
| A10 | −1.975E−19 | 0.000E+00 |
| A12 | 6.872E−24 | 0.000E+00 |
| $R_Z$ | 34.800 | ∞ |
| B2 | −6.062E−07 | 0.000E+00 |
| B4 | 1.180E−10 | 0.000E+00 |
| B6 | −7.150E−14 | 0.000E+00 |
| B8 | 2.218E−17 | 0.000E+00 |
| B10 | −3.297E−21 | 0.000E+00 |
| B12 | 1.858E−25 | 0.000E+00 |
| F2 | 0.000E+00 | −8.724E−08 |
| F4 | 0.000E+00 | −2.171E−11 |
| F6 | 0.000E+00 | 1.495E−14 |
| F8 | 0.000E+00 | −3.403E−18 |
| F10 | 0.000E+00 | 2.449E−22 |

A second example of the present invention is described below. The semiconductor lasers 51 and 52 that emit light beams 59, 60, 61, and 62 having a wavelength of 780 nanometers were used. The scanning width in the main scanning direction was 220 millimeters. A polygon mirror with six deflection planes and an inradius of 13 millimeters was used as a deflector. The incident angle with respect to the polygon mirror was 60 degrees in main-scanning cross-section and 1.46 degrees and 3.30 degrees in sub-scanning cross-section. The sub-scanning lateral magnification of the scanning optical system was −0.49. The deflection range of the polygon mirror was +24.0 degrees.

The plane of incidence and the plane of emission of the second scanning lens 116 and the planes of incidence of the first scanning lenses 117Y, 117M, 117C, and 117K were special troidal planes explained above. The planes of emission of the first scanning lenses 117Y, 117M, 117C, and 117K were special tilt-decentered planes explained above.

Also, a relative positional relation of the second scanning lenses 116 and the first scanning lenses 117Y, 117M, 117C, and 117K with respect to the inner light beams 60 and 61 and others were as represented in the following Table 5, whilst a relative positional relation of the second scanning lenses 116 and the first scanning lenses 117Y, 117M, 117C, and 117K with respect to the outer light beams 59 and 62 and others were as represented in the following Table 6.

TABLE 5

Inner light beam

| | R$_Y$(mm) | R$_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.98 | 5.03 | — | |
| Plane of incidence | −374.161 | 34.730 | (3.00) | (0.00) | 1.5240 | First scanning lens |
| Plane of emission | −965.506 | ∞ | 97.71 | — | — | |
| Plane of incidence | — | — | — | — | — | Scan target surface |

TABLE 6

Outer light beam

| | R$_Y$(mm) | R$_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.90 | 11.50 | — | |
| Plane of incidence | −374.161 | 34.730 | (3.00) | (0.00) | 1.5240 | First scanning lens |
| Plane of emission | −965.506 | ∞ | 97.58 | — | — | |
| Plane of incidence | — | — | — | — | — | Scan target surface |

In Tables 5 and 6, RY represents a curvature in a main scanning direction Y, RZ represents a curvature in a main scanning direction Y, X represents a distance to the next plane in the main scanning direction Y, Z represents a distance to the next plane in the direction X, and N represents a refractive index with respect to the light beams 59, 60, 61, and 62 having a designed wavelength.

Furthermore, parameters in Equation 1 for each type of the plane of incidence and the plane of emission of the second scanning lens 116 are represented in the following Table 7, whilst the parameters in Equation 1 for each type of the plane of incidence and the plane of emission of the first scanning lenses 117Y, 117M, 117C, and 117K are represented in the following Table 8.

TABLE 7

Aspheric coefficient (second scanning lens)

| | Plane of incidence | Plane of emission |
|---|---|---|
| R$_Y$ | −75.900 | −48.800 |
| K | 0.000E+00 | 0.000E+00 |
| A4 | −6.331E−07 | −2.120E−07 |
| A6 | 1.935E−09 | 7.447E−10 |
| A8 | −1.895E−12 | 1.787E−15 |
| A10 | 1.792E−16 | 4.771E−16 |
| A12 | −4.830E−18 | −4.624E−18 |
| R$_Z$ | ∞ | ∞ |
| B1 | 0.000E+00 | −1.472E−06 |
| B2 | 0.000E+00 | 1.291E−05 |
| B3 | 0.000E+00 | −2.363E−08 |
| B4 | 0.000E+00 | −1.552E−09 |
| B5 | 0.000E+00 | −6.507E−13 |
| B6 | 0.000E+00 | −4.993E−12 |
| B7 | 0.000E+00 | 2.075E−13 |
| B8 | 0.000E+00 | 8.532E−14 |
| B9 | 0.000E+00 | −4.182E−16 |
| B10 | 0.000E+00 | −1.436E−16 |
| B11 | 0.000E+00 | 4.337E−19 |
| B12 | 0.000E+00 | −8.006E−20 |
| B13 | 0.000E+00 | −4.335E−22 |
| B14 | 0.000E+00 | 1.667E−22 |

TABLE 8

Aspheric coefficient (first scanning lens)

| | Plane of incidence | Plane of emission |
|---|---|---|
| R$_Y$ | −374.161 | −965.506 |
| K | 0.000E+00 | 0.000E+00 |
| A4 | 1.095E−07 | −1.688E−08 |
| A6 | −1.610E−11 | 1.544E−12 |
| A8 | 2.342E−15 | −8.859E−17 |
| A10 | −1.936E−19 | 7.183E−22 |
| A12 | 7.134E−24 | 3.557E−25 |
| R$_Z$ | 34.730 | ∞ |
| B2 | −5.861E−07 | 0.000E+00 |
| B4 | 1.139E−10 | 0.000E+00 |
| B6 | −6.924E−14 | 0.000E+00 |
| B8 | 2.176E−17 | 0.000E+00 |
| B10 | −3.294E−21 | 0.000E+00 |
| B12 | 1.981E−25 | 0.000E+00 |
| B14 | 1.212E−30 | 0.000E+00 |
| B16 | −4.047E−34 | 0.000E+00 |
| F2 | 0.000E+00 | −1.497E−07 |
| F4 | 0.000E+00 | −3.553E−13 |
| F6 | 0.000E+00 | 5.541E−15 |
| F8 | 0.000E+00 | −2.134E−18 |
| F10 | 0.000E+00 | 4.134E−22 |
| F11 | 0.000E+00 | −2.966E−26 |

A third example of the present invention is described below. The semiconductor lasers 51 and 52 that emit light beams 59, 60, 61, and 62 having a wavelength of 780 nanometers were used. The scanning width in the main scanning direction was 220 millimeters. A polygon mirror with six deflection planes and an inradius of 13 millimeters was used as a deflector. The incident angle with respect to the polygon mirror was 60 degrees in main-scanning cross-section and 1.46 degrees and 3.30 degrees in sub-scanning cross-section. The sub-scanning lateral magnification of the scanning optical system was −0.49. The deflection range of the polygon mirror was ±23.4 degrees.

The plane of incidence and the plane of emission of the second scanning lens 116 were special troidal planes explained above. The planes of incidence of the first scanning lenses 117Y, 117M, 117C, and 117K were generatrix curved planes explained above, whilst the planes of emission of the first scanning lenses 117Y, 117M, 117C, and 117K were flat planes.

Also, a relative positional relation of the second scanning lenses 116 and the first scanning lenses 117Y, 117M, 117C, and 117K with respect to the inner light beams 60 and 61 and others were as represented in the following Table 9, whilst a relative positional relation of the second scanning lenses 116 and the first scanning lenses 117Y, 117M, 117C, and 117K with respect to the outer light beams 59 and 62 and others were as represented in the following Table 10.

TABLE 9

Inner light beam

| | $R_Y$(mm) | $R_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.98 | 5.03 | — | |
| Plane of incidence | −580.000 | 34.800 | (3.00) | (0.00) | 1.5240 | First scanning lens |
| Plane of emission | ∞ | ∞ | 97.71 | — | — | |
| Plane of incidence | — | — | — | — | — | Scan target surface |

TABLE 10

Outer light beam

| | $R_Y$(mm) | $R_Z$ (mm) | X (mm) | Z (mm) | N | Notes |
|---|---|---|---|---|---|---|
| Deflection plane | ∞ | ∞ | 37.48 | 0.00 | — | Deflection plane |
| Plane of incidence | −75.900 | ∞ | 5.00 | 0.00 | 1.5240 | Second Scanning lens |
| Plane of emission | −48.800 | ∞ | 160.90 | 11.50 | — | |
| Plane of incidence | −580.000 | 34.800 | (3.00) | (0.00) | 1.5240 | First scanning lens*** |
| Plane of emission | ∞ | ∞ | 97.58 | — | — | |
| Plane of incidence | — | — | — | — | — | Scan target surface |

In Tables 9 and 10, RY represents a curvature in a main scanning direction Y, RZ represents a curvature in a main scanning direction Y, X represents a distance to the next plane in the main scanning direction Y, Z represents a distance to the next plane in the direction X, and N represents a refractive index with respect to the light beams 59, 60, 61, and 62 having a designed wavelength.

Furthermore, parameters in Equation 1 for each type of the plane of incidence and the plane of emission of the second scanning lens 116 are represented in the following Table 11, whilst the parameters in Equation 1 for each type of the plane of incidence and the plane of emission of the first scanning lenses 117Y, 117M, 117C, and 117K are represented in the following Table 12.

TABLE 11

Aspheric coefficient
(second scanning lens)

| | Plane of incidence | Plane of emission |
|---|---|---|
| $R_Y$ | −75.900 | −48.800 |
| K | 0.000E+00 | 0.000E+00 |

TABLE 11-continued

Aspheric coefficient
(second scanning lens)

| | Plane of incidence | Plane of emission |
|---|---|---|
| A4 | −6.331E−07 | −2.120E−07 |
| A6 | 1.935E−09 | 7.447E−10 |
| A8 | −1.895E−12 | 1.787E−15 |
| A10 | 1.792E−16 | 4.771E−16 |
| A12 | −4.830E−18 | −4.624E−18 |
| $R_Z$ | ∞ | ∞ |
| B2 | 0.000E+00 | 9.334E−06 |
| B4 | 0.000E+00 | 2.558E−09 |
| B6 | 0.000E+00 | −1.465E−13 |
| B8 | 0.000E+00 | 6.376E−14 |
| B10 | 0.000E+00 | −8.426E−17 |
| B12 | 0.000E+00 | −3.471E−20 |

TABLE 12

Aspheric coefficient
(first scanning lens)

| | Plane of incidence | Plane of emission |
|---|---|---|
| $R_Y$ | −580.000 | ∞ |
| K | 0.000E+00 | 0.000E+00 |
| A4 | 1.073E−07 | 0.000E+00 |
| A6 | −1.501E−11 | 0.000E+00 |
| A8 | 2.308E−15 | 0.000E+00 |
| A10 | −1.975E−19 | 0.000E+00 |
| A12 | 6.872E−24 | 0.000E+00 |
| $R_Z$ | 34.800 | ∞ |
| B2 | −6.062E−07 | 0.000E+00 |
| B4 | 1.180E−10 | 0.000E+00 |
| B6 | −7.150E−14 | 0.000E+00 |
| B8 | 2.218E−17 | 0.000E+00 |
| B10 | −3.297E−21 | 0.000E+00 |
| B12 | 1.858E−25 | 0.000E+00 |
| D2 | −3.388E−06 | 0.000E+00 |
| D4 | 7.425E−11 | 0.000E+00 |
| D6 | −1.599E−13 | 0.000E+00 |
| D8 | 1.105E−16 | 0.000E+00 |
| D10 | −2.700E−20 | 0.000E+00 |
| D12 | 2.065E−24 | 0.000E+00 |

In any of the first to third examples explained above, an excellent color image without a color shift was able to be obtained.

According to an embodiment of the present invention, the curve in a scanning line at the time of forming an image from a plurality of light beams can be minimized. Therefore, the color shift can be minimized, and the number of types of component can be minimized, thereby reducing cost of the optical scanning device and also providing an optical scanning device with image quality equivalent to or higher than that of the conventional example. With this arrangement, an image forming apparatus, such as a digital copier or a laser printer, can obtain higher image quality.

Moreover, the scanning with these light beams on the scan target surface is curved in the same direction, thereby more reliably suppressing a color shift. Furthermore, since reflection mirrors can be arranged as appropriate, flexibility in disposing the reflection mirrors and the first scanning lens is increased. Thus, an optical scanning device with image quality equivalent to or higher than that of the conventional example and high flexibility in layout can be provided.

Furthermore, since the number of components can be reduced and a low-cost optical scanning device can be provided, an image forming apparatus, such as a digital copier or a laser printer, with image quality higher than ever can be achieved.

Moreover, curve in scanning lines at the time of forming images from these light beams can be reliably minimized.

Furthermore, the first scanning lens can perform a more excellent correction of a curve in a scanning line, thereby more reliably minimizing the curve in a scanning line.

Moreover, in addition to simplifying the shape of the first scanning lens, more excellent correction of a curve in a scanning line can be achieved, thereby more reliably minimizing the curve in a scanning line.

Furthermore, the first scanning lens can perform a more excellent correction of a curve in a scanning line, thereby more reliably minimizing the curve in a scanning line. Thus, an optical scanning device with a smaller curve in a scanning line, that is, a smaller color shift, can be achieved. With this arrangement, an image forming apparatus, such as a digital copier or a laser printer, can obtain higher image quality higher.

Moreover, the light beams from the light-source unit can be caused to reliably enter one deflector, thereby easily achieving colorization of an image forming apparatus with an optical scanning device.

Furthermore, the deflector can be downsized more than the case of using a polygon mirror, thereby suppressing noise occurring when the deflector deflects a light beam and also achieving power saving.

Moreover, in addition to easy colorization, downsizing can be achieved with one light-source unit emitting a plurality of light beams.

Furthermore, the curve in a scanning line can be minimized. With this, an image forming apparatus with high quality image can be provided in which an optical scanning device with its performance equivalent to or higher than that of the conventional example and also with higher image quality is used as an electrophotographic writing unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that forms images on a plurality of photoconductors, the optical scanning device comprising:
    a light-source unit that emits four light beams, each light beam corresponding to a respective one of the photoconductors;
    a deflector that rotates about a rotational axis and deflects the four light beams from the light-source unit, wherein the four light beams are all simultaneously deflected by the same surface of the deflector as each other; and
    an image-forming optical system that causes the light beams deflected by the deflector to each form a spot image on a corresponding scan target surface of each one of the photoconductors, the image-forming optical system including scanning lenses arranged on optical paths of the four light beams from the deflector to corresponding ones of the scan target surfaces, wherein
    the four light beams enter the deflector obliquely with respect to a plane extending orthogonal to the rotational axis of the deflector,
    a first light beam and a second light beam of the four light beams enter the deflector obliquely such that the first and second light beams travel in first directions to one side of the plane orthogonal to the rotational axis of the deflector, wherein the first and second light beams are present in an area to the one side of the plane orthogonal to the rotational axis of the deflector as the first and second light beams approach the deflector, the area to the one side of the plane being spaced from the plane in the direction of the rotational axis of the deflector,
    a third light beam and a fourth light beam of the four light beams enter the deflector obliquely such that the third and fourth light beams travel in second directions to the other side of the plane orthogonal to the rotational axis of the deflector, wherein the third and fourth light beams are present in an area to the other side of the plane orthogonal to the rotational axis of the deflector as the third and fourth light beams approach the deflector, the area to the other side of the plane being spaced from the plane in the direction of the rotational axis of the deflector,
    wherein the scanning lenses are arranged such that a direction of a curve in a scan line entering the scanning lenses is opposite, and to approximately the same degree, between scan lines of the first and second light beams on the one side of the plane orthogonal to the rotational axis of the deflector and between scan lines of the third and fourth light beams on the other side of the plane orthogonal to the rotational axis of the deflector, and
    a difference between A1 and A2 and a difference between A3 and A4 are an odd number, A1 being a number of reflection mirrors that reflect the beam in a sub-scanning direction that are arranged on an optical path of the first light beam from the deflector to a corresponding one of the scan target surfaces, A2 being a number of the reflection mirrors that reflect the beam in a sub-scanning direction that are arranged on an optical path of the second light beam from the deflector to a corresponding one of the scan target surfaces, A3 being a number of the reflection mirrors that reflect the beam in a sub-scanning direction that are arranged on an optical path of the third light beam from the deflector to a corresponding one of the scan target surfaces, and A4 being a number of the reflection mirrors that reflect the beam in a sub-scanning direction that are arranged on an optical path of the fourth light beam from the deflector to a corresponding one of the scan target surfaces.

2. The optical scanning device according to claim 1, wherein the image-forming optical system includes a tilt-decentered plane that is not curved in the sub-scanning direction and that variably forms a tilt angle with respect to the sub-scanning direction depending on a position in a main scanning direction.

3. The optical scanning device according to claim 2, wherein an amount of deflection of the tilt-decentered plane is zero at a reference axis of a first scanning lens.

4. The optical scanning device according to claim 1, wherein the image-forming optical system includes a generatrix curved plane in which a cross section along the sub-scanning direction forms an arch variably curved depending on a position in a main-scanning direction, and includes a generatrix on which a vertex of the arc is located is curved in the sub-scanning direction.

5. The optical scanning device according to claim 1, wherein the light-source unit emits the light beams so that the light beams enter the deflector tilted at an angle in the sub-scanning direction with respect to the normal line of the deflector.

6. The optical scanning device according to claim 1, wherein the difference between A1 and A2 is one.

7. The optical scanning device according to claim 1, wherein in a sub-scanning direction, the first light beam and the fourth light beam are located on an outside of the second light beam and the third light beam.

8. The optical scanning device according to claim 1, wherein a difference between A1 and A4 and a difference between A2 and A3 is an odd number.

9. The optical scanning device according to claim 1, wherein the first directions are downwards towards the deflector and the second directions are upwards towards the deflector.

10. The optical scanning device according to claim 1, wherein the first directions and the second directions are pointed toward opposite ends of the rotation axis.

11. The optical scanning device according to claim 1, wherein the first and second light beams approach the deflector along an obliquely downward direction and the third and fourth light beams approach the deflector along an obliquely upward direction.

12. The optical scanning device according to claim 1, wherein the light source comprises two light source units, wherein one of the two light source units emits the first and second light beams, and the other of the two light source units emits the third and fourth light beams, wherein all of the first through fourth light beams are deflected by the same surface of the deflector as each other.

13. An image forming apparatus, comprising:
a plurality of photoconductors;
a charging device that charges on a corresponding one of the photoconductors;
a developing device that develops an image on the corresponding photoconductor; and
an optical scanning device that forms images on the photoconductors, the optical scanning device including:
a light-source unit that emits four light beams, each light beam corresponding to a respective one of the photoconductors;
a deflector that rotates about a rotational axis and deflects the four light beams from the light-source unit, wherein the four light beams are all simultaneously deflected by the same surface of the deflector as each other; and
an image-forming optical system that causes the light beams deflected by the deflector to each form a spot image on a corresponding scan target surface of each one of the photoconductors, the image-forming optical system including scanning lenses arranged on optical paths of the four light beams from the deflector to corresponding ones of the scan target surfaces, wherein
the four light beams enter the deflector obliquely with respect to the plane extending orthogonal to a rotational axis of the deflector,
a first light beam and a second light beam of the four light beams enter the deflector obliquely such that the first and second light beams travel in first directions to one side of the plane orthogonal to the rotational axis of the deflector, wherein the first and second light beams are present in an area to the one side of the plane orthogonal to the rotational axis of the deflector as the first and second light beams approach the deflector, the area to the one side of the plane being spaced from the plane in the direction of the rotational axis of the deflector,
a third light beam and a fourth light beam of the four light beams enter the deflector obliquely such that the third and fourth light beams travel in second directions to the other side of the plane orthogonal to the rotational axis of the deflector, wherein the third and fourth light beams are present in an area to the other side of the plane orthogonal to the rotational axis of the deflector as the third and fourth light beams approach the deflector, the area to the other side of the plane being spaced from the plane in the direction of the rotational axis of the deflector,
wherein the scanning lenses are arranged such that a direction of a curve in a scan line entering the scanning lenses is opposite, and to approximately the same degree, between scan lines of the first and second light beams on the one side of the plane orthogonal to the rotational axis of the deflector and between scan lines of the third and fourth light beams on the other side of the plane orthogonal to the rotational axis of the deflector, and
a difference between A1 and A2 and a difference between A3 and A4 are an odd number, A1 being a number of reflection mirrors that are arranged on an optical path of the first light beam from the deflector to a corresponding one of the scan target surfaces, A2 being a number of the reflection mirrors that are arranged on an optical path of the second light beam from the deflector to a corresponding one of the scan target surfaces, A3 being a number of the reflection mirrors that are arranged on an optical path of the third light beam from the deflector to a corresponding one of the scan target surfaces, and A4 being a number of the reflection mirrors that are arranged on an optical path of the fourth light beam from the deflector to a corresponding one of the scan target surfaces.

14. The image forming apparatus according to claim 13, wherein the light source comprises two light source units, wherein one of the two light source units emits the first and second light beams, and the other of the two light source units emits the third and fourth light beams, wherein all of the first through fourth light beams are deflected by the same surface of the deflector as each other.

* * * * *